(12) United States Patent
Rzigalinski et al.

(10) Patent No.: US 12,484,576 B2
(45) Date of Patent: Dec. 2, 2025

(54) BLOOD PRESERVATION COMPOSITIONS, DEVICES, AND USES THEREOF

(71) Applicants: EDWARD VIA COLLEGE OF OSTEOPATHIC MEDICINE, Blacksburg, VA (US); Siva Sai Ramana Kumar Challa, Newton, MA (US)

(72) Inventors: Beverly A. Rzigalinski, Blacksburg, VA (US); Siva Sai Ramana Kumar Challa, Newton, MA (US)

(73) Assignees: EDWARD VIA COLLEGE OF OSTEOPATHIC MEDICINE, Blacksburg, VA (US); MILLIFLUIDICA LLC, Baton Rouge, LA (US)

( * ) Notice: Subject to any disclaimer, the term of this patent is extended or adjusted under 35 U.S.C. 154(b) by 1262 days.

(21) Appl. No.: 17/263,526

(22) PCT Filed: Jul. 26, 2019

(86) PCT No.: PCT/US2019/043785
§ 371 (c)(1),
(2) Date: Jan. 26, 2021

(87) PCT Pub. No.: WO2020/023932
PCT Pub. Date: Jan. 30, 2020

(65) Prior Publication Data
US 2021/0235690 A1    Aug. 5, 2021

Related U.S. Application Data

(60) Provisional application No. 62/703,474, filed on Jul. 26, 2018.

(51) Int. Cl.
*A01N 1/10* (2025.01)
*A01N 1/12* (2025.01)
(Continued)

(52) U.S. Cl.
CPC ............... *A01N 1/146* (2025.01); *A01N 1/12* (2025.01); *A01N 1/126* (2025.01); *A61J 1/065* (2013.01);
(Continued)

(58) Field of Classification Search
CPC . B82Y 40/00; B82Y 5/00; A61L 27/58; A61L 27/306; A61J 1/10; A61J 1/065;
(Continued)

(56) References Cited

U.S. PATENT DOCUMENTS

| | | |
|---|---|---|
| 5,460,701 A | 10/1995 | Parker et al. |
| 5,514,349 A | 5/1996 | Parker et al. |

(Continued)

FOREIGN PATENT DOCUMENTS

| | | |
|---|---|---|
| WO | 1995003907 A1 | 2/1995 |
| WO | 2017062573 A1 | 4/2017 |

OTHER PUBLICATIONS

"Partial Supplementary European Search Report (R. 164 EPC)", issued by the European Patent Office in counterpart application No. 19842184.4.
(Continued)

*Primary Examiner* — Jacqueline F Stephens
(74) *Attorney, Agent, or Firm* — Carin R. Miller; Lex Generalis, LLC

(57) ABSTRACT

Described herein are blood storage containers that can contain a CeONP composition and/or coating on an object surface. In some aspects, the blood storage container can include an insert. In some aspects the inserts can contain a CeONP compositions and/or coating on an object surface. In aspects, the CeONP composition and/or coating on an object surface can be effective to increase the useful storage lifespan of blood, blood product, and/or component thereof stored in the blood storage container. Also described herein (Continued)

are methods of making and using the CeONP compositions, coatings, and devices containing the CeONP compositions and/or coatings described herein.

16 Claims, 7 Drawing Sheets

(51) Int. Cl.

| | |
|---|---|
| A01N 1/126 | (2025.01) |
| A01N 1/146 | (2025.01) |
| A61J 1/06 | (2006.01) |
| A61J 1/10 | (2006.01) |
| A61L 27/30 | (2006.01) |
| A61L 27/58 | (2006.01) |
| B82Y 5/00 | (2011.01) |
| B82Y 30/00 | (2011.01) |
| B82Y 40/00 | (2011.01) |

(52) U.S. Cl.
CPC .............. *A61J 1/10* (2013.01); *A61L 27/306* (2013.01); *A61L 27/58* (2013.01); *B82Y 5/00* (2013.01); *B82Y 30/00* (2013.01); *B82Y 40/00* (2013.01)

(58) Field of Classification Search
CPC ... A01N 1/0226; A01N 1/0205; A01N 1/0263
See application file for complete search history.

(56) References Cited

U.S. PATENT DOCUMENTS

| | | | |
|---|---|---|---|
| 5,874,684 A | 2/1999 | Parker et al. | |
| 6,669,823 B1 | 12/2003 | Sarkas et al. | |
| 7,534,453 B1 | 5/2009 | Rzigalinski et al. | |
| 8,747,907 B2 | 6/2014 | Rzigalinski et al. | |
| 2004/0009542 A1 | 1/2004 | Dumont et al. | |
| 2011/0315567 A1 | 12/2011 | Boynton et al. | |
| 2013/0004584 A1* | 1/2013 | Rzigalinski ............... | A61P 9/00 977/773 |
| 2015/0093543 A1* | 4/2015 | Kushida ................ | A61L 31/082 264/293 |

OTHER PUBLICATIONS

Singh, et al., "Treatment of Neurodegenerative Disorders with Radical Nanomedicine", Annals of the New York Academy of Sciences, New York Academy of Sciences, US, vol. 1122, No. 1, Dec. 10, 2007 (Dec. 10, 2007), pp. 219-230, XP071405470, ISSN: 0077-8923, DOI.

"International Search Report and Written Opinion", issued by The United States Patent and Trademark Office as International Searching Authority for PCT/US2019/043785 on Dec. 3, 2019.

"Invitation to Pay Additional Fees", issued by The United States Patent and Trademark Office as International Searching Authority for PCT/US2019/043785 on Oct. 1, 2019.

Antosik, Adam, et al. "Vitamin E Analogue Protects Red Blood Cells against Storage-Induced Oxidative Damage", Transfusion Medicine and Hemotherapy, vol. 45, pp. 347-354, Published Online: Mar. 9, 2018.

Charbgoo, Fahimeh, et al., "Cerium oxide nanoparticles: green synthesis and biological applications", Int. J. Nanomedicine, vol. 12, pp. 1401-1413, Published Online: Feb. 20, 2017.

"Communication pursuant to Rule 70(2) and 70a(2) EPC", issued by the European Patent Office for application No. 19842184.4 on Sep. 6, 2022.

"Extended European Search Report", issued by the European Patent Office for application No. 19842184.4 on Aug. 18, 2022.

Bailey, et al., "Cerium Oxide Nanoparticles Improve Outcome after In Vitro and In Vivo Mild Traumatic Brain Injury," Journal of Neurotrauma 37: 1452-1462 (Jun. 15, 2020).

Bardyn, et al., "Red blood cells ageing markers: a multi-parametric analysis," Blood Transfus 2017; 15: 239-48 DOI 10.2450/2017.0318-16.

Conti, et al., "Building up spectral libraries for mapping erythrocytes by hyperspectral dark field microscopy," Biomedical Spectroscopy and Imaging 5 (2016) 175-184 175 DOI 10.3233/BSI-160133.

Copeland, et al., "Hemoglobin determination in plasma or serum by first-derivative recording spectrophotometry. Evaluation of the procedure of Soloni, Cunningham, and Amazon," Am J Clin Pathol. Nov. 1989;92(5):619-24. doi: 10.1093/ajcp/92.5.619.

Frey, et al., "Hemoglobin assay for validation and quality control of medical device reprocessing," Anal Bioanal Chem (2015) 407:6885-6889.

Giacometti, et al., "High predictive values of RBC membrane-based diagnostics by biophotonics in an integrated approach for Autism Spectrum Disorders," Scientific Reports | 7: 9854 | DOI: 10.1038/s41598-017-10361-7, all enclosed pages cited.

Gulliksson, et al., "Storage of whole blood overnight in different blood bags preceding preparation of blood components: in vitro effects on red blood cells," Blood Transfus 2009; 7: 210-5 DOI 10.2450/2009.0074-08.

Hess, "Conventional blood banking and blood component storage regulation: opportunities for improvement," Blood Transfus 2010; 8 Suppl 3:s9-s15 DOI 10.2450/2010.003S.

Lagerberg, et al., "Prevention of red cell storage lesion: a comparison of five different additive solutions," Blood Transfus 2017; 15: 456-62 DOI 10.2450/2017.0371-16.

Moore, et al., "Microscopic and thermodynamic evaluation of vesicles shed by erythrocytes at elevated temperatures," Microscopy Research and Technique 19 Dec. 2013.

Rzigalinski BA, Meehan K, Whiting MD, Dillon CE, Hockey K, and Brewer M. Antioxidant Nanoparticles in Nanomedicine in Health and Disease, RJ Hunter and VR Preedy, eds., CRC Press, NY, 2011.

Rzigalinski, "Nanoparticles and Cell Longevity," Technology in Cancer Research & Treatment .ISSN 1533-0346 vol. 4, No. 6, Dec. 2005.

Rzigalinski, et al., "Cerium Oxide Nanoparticles in Neuroprotection and Considerations for Efficacy and Safety," Wiley Interdiscip Rev Nanomed Nanobiotechnol. Jul. 2017 ; 9(4): . doi:10.1002/wnan.1444.

Rzigalinski, "Nanodrug' Shows Promise in Animal Model of Parkinson's Disease," Abstract of Scientific Presentation, Neuroscience 2014, all enclosed pages cited.

Rzigalinski BA, Meehan C, Davis RM, Miles WC, Cohen CA. Radical Nanomedicine, Nanomedicine 2006; 1: 399-412.

Singh, et al., "Treatment of Neurodegenerative Disorders with Radical Nanomedicine," Ann. N.Y. Acad. Sci. 1122: 219-230 (2007).

Verebes, et al., "Hyperspectral enhanced dark field microscopy for imaging blood cells," J. Biophotonics 6, No. 11-12, 960-967 (2013) / DOI 10.1002/jbio.201300067.

Bardyn, et al. "Oxidative stress and antioxidant defenses during blood processing and storage of erythrocyte concentrates," Transfusion Clinique et Biologique, vol. 25, pp. 96-100, 2018.

\* cited by examiner

BLOOD PRESERVATION COMPOSITIONS, DEVICES, AND USES THEREOF

CROSS-REFERENCE TO RELATED APPLICATIONS

This application is the U.S. National Stage Application under 35 U.S.C. § 371 of Patent Cooperation Treaty Application No.: PCT/US2019/043785, filed on Jul. 26, 2019, entitled BLOOD PRESERVATION COMPOSITIONS, DEVICES, AND USES THEREOF," which claims the benefit of and priority to U.S. Provisional Patent Application No. 62/703,474, filed on Jul. 26, 2018, entitled "CERIUM OXIDE NANOPARTICLES FOR PRESERVATION OF BLOOD AND BLOOD PRODUCTS" the contents of which are incorporated by reference herein in their entireties.

TECHNICAL FIELD

The subject matter disclosed herein is generally directed to blood preservation compositions, devices, and uses thereof.

BACKGROUND

Storage of blood, blood products, and components thereof is important for many clinical purposes. Current blood storage methods are time limited, which can lead to unusable blood, blood products, and components thereof, particularly where lengthy and/or unrefrigerated storage is needed. As such, there exists a need for improved and/or additional compositions and techniques to store blood, blood products, and/or components thereof.

SUMMARY

Described herein are aspects of a blood storage container comprising a blood storage container object surface, comprising: cerium oxide nanoparticles (CeONPs) present in an amount effective to increase the useful storage life of blood, blood product(s), components thereof, and combinations thereof when such blood, blood product(s), and components thereof are stored in contact with the blood storage container object surface. In some aspects, the CeONPs are contained in a liquid composition present within the blood storage container and capable of mixing with blood, blood product, or components thereof stored within the blood storage container. In some aspects, the CeONPs are contained in a solid composition present within the blood storage container and capable of being reconstituted upon mixing with blood, blood product, or components thereof stored within the blood storage container. In some aspects, the concentration of the CeONPs after mixing ranges from about 10 nm to about 100 nm. In some aspects, the largest dimension of the CeONPs range from about 2 nm to about 50 nm.

In some aspects, the blood storage container comprises a coating disposed on one or more areas of the blood container object surface area, wherein the CeONPs form or are part of a composition that forms the coating on the one or more areas of the blood storage container object surface. In some aspects, the coating is biodegradable. In some aspects, the the largest dimension of the CeONPs range from about 2 nm to about 50 nm.

In some aspects, the blood storage container further comprises and insert, wherein the insert comprises an insert object surface. In some aspects, the insert comprises one or more openings or voids. In some aspects, the insert object surface comprises a coating, wherein the coating is disposed on one or more areas on the insert object surface and wherein the coating on the insert object surface comprises CeONPs present in an amount effective to increase the useful storage life of blood, blood product(s), components thereof, and combinations thereof when such blood, blood product(s), and components thereof are stored in contact with the insert object surface in the blood storage container. In some aspects the coating is biodegradable.

In some aspects, the blood storage container further comprises blood, blood product, blood component and combinations thereof contained within the container.

In some aspects, the blood storage container is a blood storage bag. In some aspects, the blood storage container is part of a blood, blood product, or component(s) thereof storage, collection, filtration, or delivery system.

Also described herein are aspects of a blood storage container as described herein. In some aspects the system is a blood, blood product, or component(s) thereof storage, collection, filtration, or delivery system.

Also described herein are aspects of a method comprising the step of storing blood, blood product, component thereof, or a combination thereof at a temperature ranging from about −80 degrees C. to about 45 degrees C., wherein the blood, blood product, component thereof, or a combination thereof is contained in a blood storage container as described herein. In some aspects, the temperature ranges from about −80 degrees C. to about 4 degrees C. In some aspects, the temperature ranges from about 5 degrees C. to 29 degrees C. In some aspects, temperature ranges from 30 degrees C. to about 45 degrees C. In some aspects, the step of storing blood, blood product, component thereof, or combination thereof occurs for 1 to 200 days.

Also described herein are aspects of a method comprising the step of storing the whole blood at a temperature ranging from about −80 degrees C. to about 45 degrees C., wherein the whole blood is contained in a blood storage container as described herein. In some aspects, the temperature ranges from about −80 degrees C. to 4 degrees C. and wherein the whole blood is stored for 1 to 200 days. In some aspects, the temperature ranges from 5 to 29 degrees C. or from 30 to about 45 degrees C. and wherein the whole blood is stored for 1 to 28 days. In some aspects the method further comprises the step of administering the stored whole blood after storage to a subject.

Also described herein are aspects of a method of storing red blood cells, the method comprising storing the red blood cells at a temperature ranging from about −80 degrees C. to about 45 degrees C., wherein the red blood cells are contained in a blood storage container as described herein. In some aspects, the temperature ranges from 5 to 29 degrees C. or from 30 to about 45 degrees C., wherein the red blood cells are stored for 1 to 28 days. In some aspects, the temperature ranges from about −80 degrees C. to 4 degrees C. and wherein the red blood cells are stored for 1 to 200 days. In some aspects, the method further comprises the step of administering the stored red blood cells after storage to a subject.

Also described herein are aspects of a method of storing platelets that comprises storing the platelets at a temperature ranging from about 5 degrees C. to about 29 degrees C. and wherein the platelets are contained in a blood storage container as described herein. In some aspects, the temperature ranges from 5 to 29 degrees C. or from 30 to about 45 degrees C. and wherein the platelets are stored for 1 to 28 days. In some aspects, the method further comprises the step of administering the stored platelets after storage to a subject.

Also described herein are aspects of a method comprising depositing blood, blood product, component(s) thereof, and combinations thereof into a blood storage container as described herein. In some aspects the method can further include storing the blood storage container for a period of time at a temperature. In some aspects, the period of time ranges from 1 to 200 days. In some aspects, the temperature ranges from about −80 to about 45 degrees C. In some aspects, the temperature ranges from about −80 to about 45 degrees C.

Also described herein are aspects of a blood container insert having an object surface, the insert comprising: a coating, wherein the coating is disposed on one or more areas on the object surface and wherein the coating on the object surface comprises CeONPs present in an amount effective to increase the useful storage life of blood, blood product(s), components thereof, and combinations thereof when such blood, blood product(s), and components thereof are stored in contact with the insert object surface inside of the blood storage container. In some aspects, the blood container insert comprises one or more openings or voids. In some aspects, the coating is biodegradable.

Also described herein are aspects of an implant having an object surface comprising: a coating, wherein the coating is disposed on one or more areas on the object surface and wherein the coating on the object surface comprises CeONPs.

Also described herein are aspects of a method comprising: implanting an implant as described herein into a subject in need thereof.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
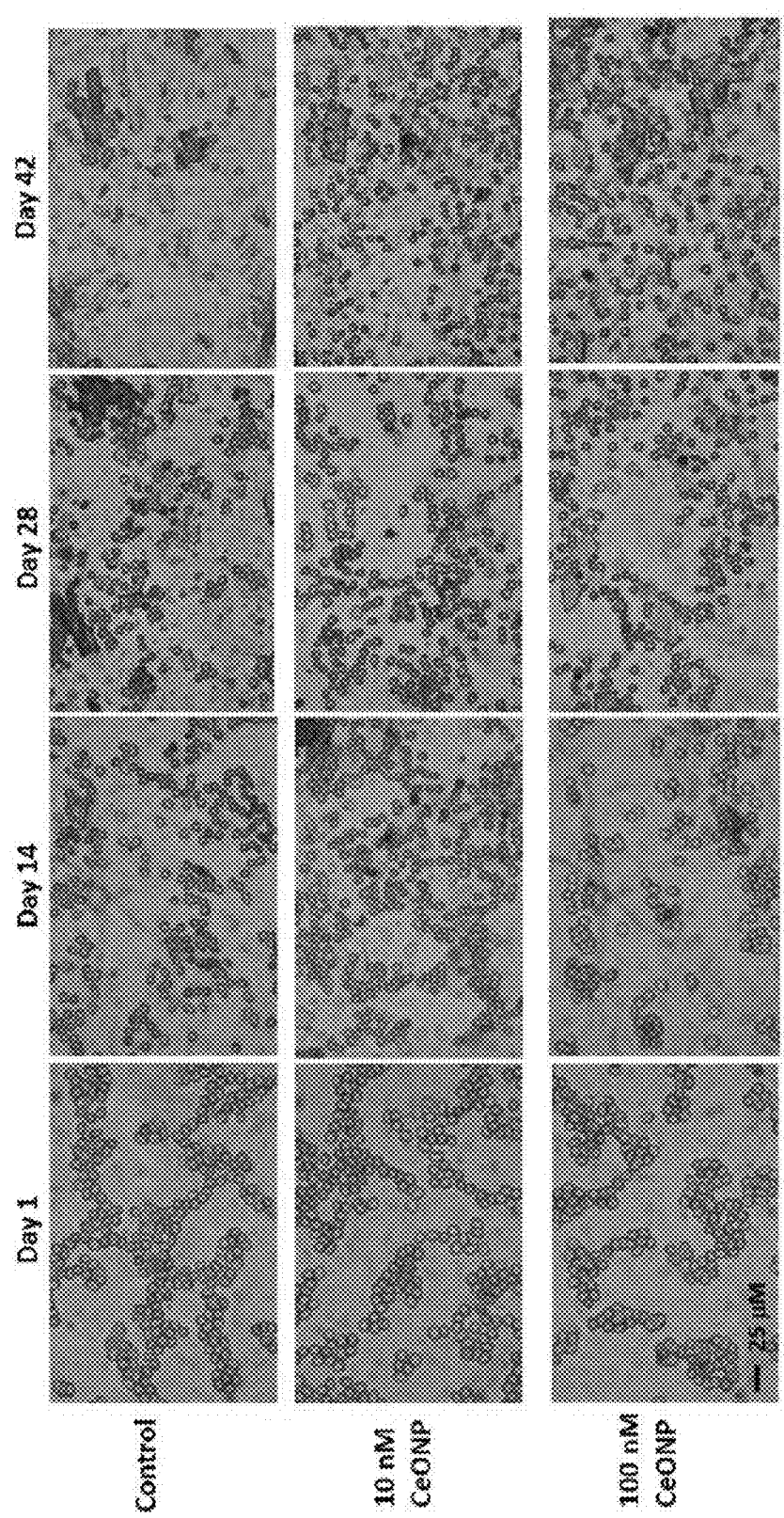
FIG. 1 shows a panel of microscopic images that can demonstrate that CeONPs can preserve red blood cells in whole stored rat blood. Light micrographs of whole blood smears in control and CeONP-treated blood at the indicated time points after collection. CeONPs were added on day 1 of storage. Total magnification: 20X. Scale bar in lower left image.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.01% to 5%" should be interpreted to include not only the explicitly recited values of about 0.01% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of molecular biology, microbiology, chemistry organic chemistry, biochemistry, physiology, cell biology, hematology, immunology, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

As used herein, "active agent" or "active ingredient" refers to a substance, compound, or molecule, which is biologically active or otherwise, induces a biological or physiological effect on a subject to which it is administered to. In other words, "active agent" or "active ingredient" refers to a component or components of a composition to which the whole or part of the effect of the composition is attributed.

As used herein, "agent" refers to any substance, compound, molecule, and the like, which can be biologically active or otherwise can induce a biological and/or physiological effect on a subject to which it is administered to. An agent can be a primary active agent, or in other words, the component(s) of a composition to which the whole or part of the effect of the composition is attributed. An agent can be a secondary or additional active agent, or in other words, the component(s) of a composition to which an additional part and/or other effect of the composition is attributed.

As used herein, "attached" can refer to covalent or non-covalent interaction between two or more molecules. Non-covalent interactions can include ionic bonds, electrostatic interactions, van der Walls forces, dipole-dipole interactions, dipole-induced-dipole interactions, London dispersion forces, hydrogen bonding, halogen bonding, electromagnetic interactions, π-π interactions, cation-π interactions, anion-π interactions, polar π-interactions, and hydrophobic effects.

The term "biocompatible", as used herein, refers to a substance or object that performs its desired function when introduced into an organism without inducing significant inflammatory response, immunogenicity, or cytotoxicity to native cells, tissues, or organs, or to cells, tissues, or organs introduced with the substance or object. For example, a biocompatible product is a product that performs its desired function when introduced into an organism without inducing significant inflammatory response, immunogenicity, or cytotoxicity to native cells, tissues, or organs.

Biocompatibility, as used herein, can be quantified using the following in vivo biocompatibility assay. A material or product is considered biocompatible if it produces, in a test of biocompatibility related to immune system reaction, less than 50%, 45%, 40%, 35%, 30%, 25%, 20%, 15%, 10%, 8%, 6%, 5%, 4%, 3%, 2%, or 1% of the reaction, in the same test of biocompatibility, produced by a material or product the same as the test material or product except for a lack of the surface modification on the test material or product. Examples of useful biocompatibility tests include measuring and assessing cytotoxicity in cell culture, inflammatory response after implantation (such as by fluorescence detection of cathepsin activity), and immune system cells recruited to an implant (for example, macrophages and neutrophils).

The term "biodegradable" as used herein, generally refers to a material that will degrade or erode under physiologic conditions to smaller units or chemical species that are capable of being metabolized, eliminated, or excreted by the subject. The degradation time is a function of composition and morphology. Degradation times can be hours, weeks, months or more.

The term "blood", as used herein, refers whole blood. This can include whole blood with or without additives, diluents, or other compositions, non-blood cells, etc. added to it. Blood includes blood obtained from a single source and pools of blood from multiple sources. The term "blood product" refers to any therapeutic product produced from or with blood or a component thereof. The term "blood component" can refer to any part, fraction, cell, or molecule of blood. Often the phrase "blood, blood product, and components thereof" is used herein. This is to mean blood, blood products, blood components, and blood product components. In some aspects, blood components are also blood products and vice versa. In some aspects, blood is also a blood product. Also, derivatives of blood components, such as plasma derivatives, are considered blood products as the term is used herein. "Blood components" includes, but is not limited to, red blood cells, white blood cells, platelets, and plasma.

As used herein, "coating" refers to any temporary, semipermanent or permanent layer, covering or surface. A coating can be applied as a gas, vapor, liquid, paste, semi-solid, or solid. In addition a coating can be applied as a liquid and solidified into a hard coating. Elasticity can be engineered into coatings to accommodate pliability, e.g. swelling or shrinkage, of the substrate or surface to be coated.

As used herein, "control" can refer to an alternative subject or sample used in an experiment for comparison purpose and included to minimize or distinguish the effect of variables other than an independent variable.

As used herein, copolymer generally refers to a single polymeric material that is comprised of two or more different monomers. The copolymer can be of any form, such as random, block, graft, etc. The copolymers can have any end-group, including capped or acid end groups. Copolymers include, but are not necessarily limited to, those including 1, 2, 3, 4, or more different monomers.

As used herein, "mammal," for the purposes of treatments, can refer to any animal classified as a mammal, including human, domestic and farm animals, nonhuman primates, and zoo, sports, or pet animals, such as, but not limited to, dogs, horses, cats, and cows.

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

The term "nanoparticle" as used herein includes a nanoscale deposit of a homogenous or heterogeneous material. Nanoparticles may be regular or irregular in shape and may be formed from a plurality of co-deposited particles that form a composite nanoscale particle. Nanoparticles may be generally spherical in shape or have a composite shape formed from a plurality of co-deposited generally spherical particles. Exemplary shapes for the nanoparticles include, but are not limited to, spherical, rod, elliptical, cylindrical, disc, and the like. In some embodiments, the nanoparticles have a substantially spherical shape.

As used herein, "organism", "host", and "subject" refers to any living entity comprised of at least one cell. A living organism can be as simple as, for example, a single isolated eukaryotic cell or cultured cell or cell line, or as complex as a mammal, including a human being, and animals (e.g., vertebrates, amphibians, fish, mammals, e.g., cats, dogs, horses, pigs, cows, sheep, rodents, rabbits, squirrels, bears, primates (e.g., chimpanzees, gorillas, and humans).

As used herein, "polymer" refers to molecules made up of monomers repeat units linked together. "Polymers" are understood to include, but are not limited to, homopolymers, copolymers, such as for example, block, graft, random and alternating copolymers, terpolymers, etc. and blends and modifications thereof. "A polymer" can be can be a three-dimensional network (e.g. the repeat units are linked together left and right, front and back, up and down), a two-dimensional network (e.g. the repeat units are linked together left, right, up, and down in a sheet form), or a one-dimensional network (e.g. the repeat units are linked left and right to form a chain). "Polymers" can be composed, natural monomers or synthetic monomers and combinations thereof. The polymers can be biologic (e.g. the monomers are biologically important (e.g. an amino acid), natural, or synthetic.

The term "polyamide" as used herein means the well-known fiber-forming substance that is a long-chain synthetic polyamide. The term particularly relates to poly (ε-caprolactam; "nylon 6") and poly (hexamethylene adipamide; "nylon 6,6") as well as their copolymers.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof. A common example of a polyester is poly(ethylene terephthalate) which is a condensation product of ethylene glycol and terephthalic acid.

As used herein, the term "specific binding" can refer to non-covalent physical association of a first and a second moiety wherein the association between the first and second moieties is at least 2 times as strong, at least 5 times as strong as, at least 10 times as strong as, at least 50 times as strong as, at least 100 times as strong as, or stronger than the association of either moiety with most or all other moieties present in the environment in which binding occurs. Binding of two or more entities may be considered specific if the equilibrium dissociation constant, Kd, is $10^{-3}$ M or less, $10^{-4}$ M or less, $10^{-5}$ M or less, $10^{-6}$ M or less, $10^{-7}$ M or less, $10^{-8}$ M or less, $10^{-9}$ M or less, $10^{-10}$ M or less, $10^{-11}$ M or less, or $10^{-12}$ M or less under the conditions employed, e.g., under physiological conditions such as those inside a cell or consistent with cell survival. In some embodiments, specific binding can be accomplished by a plurality of weaker interactions (e.g., a plurality of individual interactions, wherein each individual interaction is characterized by a Kd of greater than $10^{-3}$ M). In some embodiments, specific binding, which can be referred to as "molecular recognition," is a saturable binding interaction between two entities that is dependent on complementary orientation of functional groups on each entity. Examples of specific binding interactions include primer-polynucleotide interaction, aptamer-aptamer target interactions, antibody-antigen interactions, avidin-biotin interactions, ligand-receptor interactions, metal-chelate interactions, hybridization between complementary nucleic acids, etc.

As used herein, "object surface" in the context herein, refers to a boundary of a product or object. The object surface can be an interior surface (e.g. the interior boundary of a hollow product), or an exterior or outer boundary or a product. Generally, the object surface of a product corresponds to the idealized surface of a three dimensional solid that is topological homeomorphic with the product. The surface can be an exterior surface or an interior surface. An exterior surface forms the outermost layer of a product or device. An interior surface surrounds an inner cavity of a product or device, such as the inner cavity of a tube. As an example, both the outside object surface of a tube (or container) and the inside surface of a tube are part of the surface of the tube. However, internal surfaces of the product that are not in topological communication with the exterior surface, such as a tube with closed ends, can be excluded as the surface of a product. In some embodiments, an exterior object surface of the product is modified, e.g., a surface that is coated with a CeONP composition described herein. In some embodiments, where the product is porous or has holes in its mean (idealized or surface), the internal faces of passages and holes are not considered part of the surface of the product if its opening on the mean object surface of the product is less than 1 μm.

As used herein, "substantial" and "substantially," specify an amount of between 95% and 100%, inclusive, between 96% and 100%, inclusive, between 97% and 100%, inclusive, between 98% 100%, inclusive, or between 99% 100%, inclusive.

As used herein, "substantially free" can mean an object species is present at non-detectable or trace levels so as not to interfere with the properties of a composition or process.

As used herein, "substantially pure" can mean an object species is the predominant species present (i.e., on a molar basis it is more abundant than any other individual species in the composition), and preferably a substantially purified fraction is a composition wherein the object species comprises about 50 percent of all species present. Generally, a substantially pure composition will comprise more than about 80 percent of all species present in the composition, more preferably more than about 85%, 90%, 95%, and 99%. Most preferably, the object species is purified to essential homogeneity (contaminant species cannot be detected in the composition by conventional detection methods) wherein the composition consists essentially of a single species.

As used herein, "substituted," refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups can be further substituted. "Substituted," as used herein, refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, amino acid, poly(lactic-co-glycolic acid), peptide, and polypeptide groups can be further substituted.

As used interchangeably herein, the terms "sufficient" and "effective," can refer to an amount (e.g. mass, volume, dosage, concentration, and/or time period) needed to achieve one or more desired result(s). For example, a therapeutically effective amount refers to an amount needed to achieve one or more therapeutic effects.

A "suitable control" is a control that will be instantly appreciated by one of ordinary skill in the art as one that is included such that it can be determined if the variable being evaluated an effect, such as a desired effect or hypothesized effect. One of ordinary skill in the art will also instantly appreciate based on inter alia, the context, the variable(s), the desired or hypothesized effect, what is a suitable or an appropriate control needed.

As used herein, "therapeutic" can refer to treating, healing, and/or ameliorating a disease, disorder, condition, or side effect, or to decreasing in the rate of advancement of a disease, disorder, condition, or side effect. A "therapeutically effective amount" can therefore refer to an amount of a compound that can yield a therapeutic effect.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

DISCUSSION

Blood is an important biological fluid that is vital to clinical medicine, diagnosis and health monitoring, and research. Currently, the storage of blood and components is limited to about 42 days with refrigeration. However, even with refrigeration degradative and other changes occur in red blood cells (RBC) and other molecules present in blood well before that and in some cases as early as 11 to 21 days after collection. This can impact the performance of the blood when reintroduced to a patient in a clinical setting, alter diagnostic or other health monitoring results, and alter research results thus biasing or limiting the usefulness of the results. Without refrigeration, the onset of degradation is even earlier and the blood is often unusable within a short time. This poses significant challenges for collection and transport of blood where refrigeration is not possible such as in remote and developing areas. In particular, military use of blood is high, particularly in war zones where. Often storage constraints on blood and blood products in these areas produces a high demand for a limited usable supply. This problem is compounded when refrigeration is unavailable or suboptimal. Thus, there exists a need for improved compositions, techniques, and/or devices for blood and/or blood component storage.

With that said, described herein are compositions, techniques, and devices that can be capable of increasing the life-span of blood and/or blood components during storage (i.e. usable storage time), particularly when refrigeration is absent or suboptimal. Described herein are aspects of a blood storage container that can include a cerium oxide nanoparticle (CeONPs) containing coating and/or an insert that is coated with CeONPs. Also described herein are aspects of coating solutions that can contain CeONPs that can be effective to increase the usable storage time of blood and/or blood components. Also described herein are systems can that can include one or more of the blood storage containers described herein. Also described herein are methods of making and using the compositions and devices described herein. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Cerium Oxide Nanoparticle Compositions

Described herein are aspects of cerium oxide nanoparticle (CeNP) containing compositions. In some aspects, such as those described elsewhere herein, the CeNP compositions described herein can be included in stored blood, included as a solution in a blood storage container, coated on one or more inside surfaces of a blood storage container, and/or coated on the surface of an insert that can be included in a blood storage container. The CeNP nanoparticle composition can be effective to increase the storage life of blood, component thereof, and/or blood product.

Cerium is a rare earth element of the lanthanide series. Cerium occurs in a trivalent (+3) and tetravalent (+4) state. The state of cerium occurs in a recycling manner and flip-flops between the +3 and +4 valent states via a redox reaction. Cerium can thus act as an oxygen buffer because of this redox capacity. As a result of the alteration in cerium oxidation state, cerium oxide can form oxygen vacancies or defects in the its crystal lattice structure by loss of oxygen and/or its electrons. The valance and defect structure of cerium oxide is dynamic and can change spontaneously or as the result of physical parameters such as temperature, nanoparticle size pressure of other ions, and partial pressure of oxygen. Thus, in some aspects, the valance state can be optionally manipulated as desired by altering one or more physical parameters.

The CeONPs can contain only CeO (i.e. be a nanoparticle containing only CeO). In some aspects, the CeONPs can have a core-shell structure where the shell contains CeO. In some of these aspects, the shell is homogeneous and contains only CeO. In other aspects, the shell is heterogenous and contains other materials in addition to CeO. In some aspects, the additional material is a functionalization moiety. Synthesis of the CeONPs can be by any suitable method(s). Such methods will be instantly appreciated by those of ordinary skill in the art. In some aspects, the CeONPs can be synthesized according to any method described in e.g. U.S. Pat. Nos. 6,669,823, 5,460,701, 5,514,349, 5,874,684, Japanese Patents JP2980987 and JP3383608, European Patent EP07 11217B1, German Patent DE69426886, French Patent FR94922757, Great Britain Patent GB94922757, and Australian Patent AUO68582882, which are incorporated by reference. The compositions can be liquid, solid, gel, or semi-solid. In some aspects, the CeONPs can be synthesized as pharmaceutical grade. In some aspects, the CeONPs can be synthesized according to U.S. Pat. Nos. 6,669,823, 5,460, 701, 5,514,349, 5,874,684.

In some aspects, the CeONPs can be functionalized and contain one or more other moieties that provide a functional attribute to the CeONP. In some aspects, the functional attribute can be attachment to an object surface. In some aspects, the CeONP can further an attachment moiety that can be capable of attaching a CeONP to an object surface. The attachment moiety can be a linker that can form a physical link between the CeONP and the object surface. The attachment moiety can alter the physical characteristic of the CeONP to increase attachment or association with the object surface. In some aspects, the attachment moiety can alter the zeta potential of the CeONP. In some aspects, the attachment moiety can be a ligand for a binding on the object surface. In some aspects, the attachment moiety can be a binding partner for a ligand on the object surface. The ligand can specifically bind the binding partner moiety. In some aspects the functionalization moiety can be an enzyme that is capable of degrading a coating matrix as is described elsewhere herein.

Any suitable linker can be used in accordance with the present invention. Linkers may be used to form amide linkages, ester linkages, disulfide linkages, etc. Linkers may contain carbon atoms or heteroatoms (e.g., nitrogen, oxygen, sulfur, etc.). Typically, linkers are 1 to 50 atoms long, 1 to 40 atoms long, 1 to 25 atoms long, 1 to 20 atoms long, 1 to 15 atoms long, 1 to 10 atoms long, or 1 to 10 atoms long. Linkers may be substituted with various substituents including, but not limited to, hydrogen atoms, alkyl, alkenyl, alkynl, amino, alkylamino, dialkylamino, trialkylamino, hydroxyl, alkoxy, halogen, aryl, heterocyclic, aromatic heterocyclic, cyano, amide, carbamoyl, carboxylic acid, ester, thioether, alkylthioether, thiol, and ureido groups. As would be appreciated by one of skill in this art, each of these groups may in turn be substituted.

In some embodiments, a linker is an aliphatic or heteroaliphatic linker. In some embodiments, the linker is a polyalkyl linker. In certain embodiments, the linker is a polyether linker. In certain embodiments, the linker is a polyethylene linker. In certain specific embodiments, the linker is a polyethylene glycol (PEG) linker.

In some embodiments, the linker is a cleavable linker. To give but a few examples, cleavable linkers include protease cleavable peptide linkers, nuclease sensitive nucleic acid linkers, lipase sensitive lipid linkers, glycosidase sensitive carbohydrate linkers, pH sensitive linkers, hypoxia sensitive linkers, photo-cleavable linkers, heat-labile linkers, enzyme cleavable linkers (e.g. esterase cleavable linker), ultrasound-sensitive linkers, x-ray cleavable linkers, etc. In some embodiments, the linker is not a cleavable linker. In aspects where the linker is cleavable, this can allow for controlled release of the CeONP into a material stored with in a container based upon cleavability of the linker.

Any of a variety of methods can be used to associate a linker with a CeONP and/or an object surface. General strategies include passive adsorption (e.g., via electrostatic interactions), multivalent chelation, high affinity non-covalent binding between members of a specific binding pair, covalent bond formation, etc. (Gao et al., 2005, Curr. Op. Biotechnol., 16:63; incorporated herein by reference). In some embodiments, click chemistry can be used to associate a linker with a particle.

In some aspects, the CeONP can be functionalized with a secondary active agent in addition to the CeONP itself. The secondary active agent can be coupled to the CeONP. The secondary active agent can be attached to the CeONP. Secondary active agents can include polynucleotides, amino acids, peptides, polypeptides, antibodies, aptamers, ribozymes, hormones, metals, immunomodulators, anti-inflammatoires, anti-histamines, anti-infectives, chemotherapeutics, and combinations thereof.

Suitable hormones include, but are not limited to, amino-acid derived hormones (e.g. melatonin and thyroxine), small peptide hormones and protein hormones (e.g. thyrotropin-releasing hormone, vasopressin, insulin, growth hormone, luteinizing hormone, follicle-stimulating hormone, and thyroid-stimulating hormone), eicosanoids (e.g. arachidonic acid, lipoxins, and prostaglandins), and steroid hormones (e.g. estradiol, testosterone, tetrahydro testosteron Cortisol). Suitable immunomodulators include, but are not limited to, prednisone, azathioprine, 6-MP, cyclosporine, tacrolimus, methotrexate, interleukins (e.g. IL-2, IL-7, and IL-12), cytokines (e.g. interferons (e.g. IFN-α, IFN-β, IFN-ε, IFN-K, IFN-ω, and IFN-γ), granulocyte colony-stimulating factor, and imiquimod), chemokines (e.g. CCL3, CCL26 and CXCL7), cytosine phosphate-guanosine, oligodeoxynucleotides, glucans, antibodies, and aptamers).

Suitable anti-histamines include, but are not limited to, H1-receptor antagonists (e.g. acrivastine, azelastine, bilastine, brompheniramine, buclizine, bromodiphenhydramine, carbinoxamine, cetirizine, chlorpromazine, cyclizine, chlorpheniramine, clemastine, cyproheptadine, desloratadine, dexbromapheniramine, dexchlorpheniramine, dimenhydrinate, dimetindene, diphenhydramine, doxylamine, ebasine, embramine, fexofenadine, hydroxyzine, levocetirzine, loratadine, meclozine, mirtazapine, olopatadine, orphenadrine, phenindamine, pheniramine, phenyltoloxamine, promethazine, pyrilamine, quetiapine, rupatadine, tripelennamine, and triprolidine), H2-receptor antagonists (e.g. cimetidine, famotidine, lafutidine, nizatidine, rafitidine, and roxatidine), tritoqualine, catechin, cromoglicate, nedocromil, and p2-adrenergic agonists.

Suitable anti-infectives include, but are not limited to, amebicides (e.g. nitazoxanide, paromomycin, metronidazole, tinidazole, chloroquine, miltefosine, amphotericin b, and iodoquinol), aminoglycosides (e.g. paromomycin, tobramycin, gentamicin, amikacin, kanamycin, and neomycin), anthelmintics (e.g. pyrantel, mebendazole, ivermectin, praziquantel, abendazole, thiabendazole, oxamniquine), antifungals (e.g. azole antifungals (e.g. itraconazole, fluconazole, posaconazole, ketoconazole, clotrimazole, miconazole, and voriconazole), echinocandins (e.g. caspofungin, anidulafungin, and micafungin), griseofulvin, terbinafine, flucytosine, and polyenes (e.g. nystatin, and amphotericin b), antimalarial agents (e.g. pyrimethamine/sulfadoxine, artemether/lumefantrine, atovaquone/proquanil, quinine, hydroxychloroquine, mefloquine, chloroquine, doxycycline, pyrimethamine, and halofantrine), antituberculosis agents (e.g. aminosalicylates (e.g. aminosalicylic acid), isoniazid/rifampin, isoniazid/pyrazinamide/rifampin, bedaquiline, isoniazid, ethambutol, rifampin, rifabutin, rifapentine, capreomycin, and cycloserine), antivirals (e.g. amantadine, rimantadine, abacavir/lamivudine, emtricitabine/tenofovir, cobicistat/elvitegravir/emtricitabine/tenofovir, efavirenz/emtricitabine/tenofovir, avacavir/lamivudine/zidovudine, lamivudine/zidovudine, emtricitabine/tenofovir, emtricitabine/opinavir/ritonavir/tenofovir, interferon alfa-2v/ribavirin, peginterferon alfa-2b, maraviroc, raltegravir, dolutegravir, enfuvirtide, foscarnet, fomivirsen, oseltamivir, zanamivir, nevirapine, efavirenz, etravirine, rilpivirine, delaviridine, nevirapine, entecavir, lamivudine, adefovir, sofosbuvir, didanosine, tenofovir, avacivr, zidovudine, stavudine, emtricitabine, xalcitabine, telbivudine, simeprevir, boceprevir, telaprevir, lopinavir/ritonavir, fosamprenvir, dranuavir, ritonavir, tipranavir, atazanavir, nelfinavir, amprenavir, indinavir, sawuinavir, ribavirin, valcyclovir, acyclovir, famciclovir, ganciclovir, and valganciclovir), carbapenems (e.g. doripenem, meropenem, ertapenem, and cilastatin/imipenem), cephalosporins (e.g. cefadroxil, cephradine, cefazolin, cephalexin, cefepime, ceftaroline, loracarbef, cefotetan, cefuroxime, cefprozil, loracarbef, cefoxitin, cefaclor, ceftibuten, ceftriaxone, cefotaxime, cefpodoxime, cefdinir, cefixime, cefditoren, cefizoxime, and ceftazidime), glycopeptide antibiotics (e.g. vancomycin, dalbavancin, oritavancin, and telvancin), glycylcyclines (e.g. tigecycline), leprostatics (e.g. clofazimine and thalidomide), lincomycin and derivatives thereof (e.g. clindamycin and lincomycin), macrolides and derivatives thereof (e.g. telithromycin, fidaxomicin, erthromycin, azithromycin, clarithromycin, dirithromycin, and troleandomycin), linezolid, sulfamethoxazole/trimethoprim, rifaximin, chloramphenicol, fosfomycin, metronidazole, aztreonam, bacitracin, penicillins (amoxicillin, ampicillin, bacampicillin, carbenicillin, piperacillin, ticarcillin, amoxicillin/clavulanate, ampicillin/sulbactam, piperacillin/tazobactam, clavulanate/ticarcillin, penicillin, procaine penicillin, oxaxillin, dicloxacillin, and nafcillin), quinolones (e.g. lomefloxacin, norfloxacin, ofloxacin, qatifloxacin, moxifloxacin, ciprofloxacin, levofloxacin, gemifloxacin, moxifloxacin, cinoxacin, nalidixic acid, enoxacin, grepafloxacin, gatifloxacin, trovafloxacin, and sparfloxacin), sulfonamides (e.g. sulfamethoxazole/trimethoprim, sulfasalazine, and sulfasoxazole), tetracyclines (e.g. doxycycline, demeclocycline, minocycline, doxycycline/salicyclic acid, doxycycline/omega-3 polyunsaturated fatty acids, and tetracycline), and urinary anti-infectives (e.g. nitrofurantoin, methenamine, fosfomycin, cinoxacin, nalidixic acid, trimethoprim, and methylene blue).

Suitable chemotherapeutics include, but are not limited to, paclitaxel, brentuximab vedotin, doxorubicin, 5-FU (fluorouracil), everolimus, pemetrexed, melphalan, pamidronate, anastrozole, exemestane, nelarabine, ofatumumab, bevacizumab, belinostat, tositumomab, carmustine, bleomycin, bosutinib, busulfan, alemtuzumab, irinotecan, vandetanib, bicalutamide, lomustine, daunorubicin, clofarabine, cabozantinib, dactinomycin, ramucirumab, cytarabine, Cytoxan, cyclophosphamide, decitabine, dexamethasone, docetaxel, hydroxyurea, decarbazine, leuprolide, epirubicin, oxaliplatin, asparaginase, estramustine, cetuximab, vismodegib, asparginase Erwinia chrysanthemi, amifostine, etoposide, flutamide, toremifene, fulvestrant, letrozole, degarelix, pralatrexate, methotrexate, floxuridine, obinutuzumab, gemcitabine, afatinib, imatinib mesylatem, carmustine, eribulin, trastuzumab, altretamine, topotecan, ponatinib, idarubicin, ifosfamide, ibrutinib, axitinib, interferon alfa-2a, gefitinib, romidepsin, ixabepilone, ruxolitinib, cabazitaxel, ado-trastuzumab emtansine, carfilzomib, chlorambucil, sargramostim, cladribine, mitotane, vincristine, procarbazine, megestrol, trametinib, mesna, strontium-89 chloride, mechlorethamine, mitomycin, busulfan, gemtuzumab ozogamicin, vinorelbine, filgrastim, pegfilgrastim, sorafenib, nilutamide, pentostatin, tamoxifen, mitoxantrone, pegaspargase, denileukin diftitox, alitretinoin, carboplatin, pertuzumab, cisplatin, pomalidomide, prednisone, aldesleukin, mercaptopurine, zoledronic acid, lenalidomide, rituximab, octretide, dasatinib, regorafenib, histrelin, sunitinib, siltuximab, omacetaxine, thioguanine (tioguanine), dabrafenib, erlotinib, bexarotene, temozolomide, thiotepa, thalidomide, BCG, temsirolimus, bendamustine hydrochloride, triptorelin, aresnic trioxide, lapatinib, valrubicin, panitumumab, vinblastine, bortezomib, tretinoin, azacitidine, pazopanib, teniposide, leucovorin, crizotinib, capecitabine, enzalutamide, ipilimumab, goserelin, vorinostat, idelalisib, ceritinib, abiraterone, epothilone, tafluposide, azathioprine, doxifluridine, vindesine, and all-trans retinoic acid.

Suitable metals include, but are not limited to, Ag, Au, Fe, Cu, Zn, Al, Ni, Zr, Mo, Sn, Tl, B, Bi, Ba, Sb, combinations thereof, alloys thereof, and/or derivatives thereof.

In some aspects, the largest dimension of a CeONP can range from about 2 nm to about 50 nm. In some aspects, the largest dimension of a CeONP can be about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the largest dimension of a can range from about 2 nm to about 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the largest dimension of a CeONP can be about 10, 10.5, 11, 11.5, 12, 12.5, 13, 13.5, 14, 14.5, 15, 15.5, 16, 16.5, 17, 17.5, 18, 18.5, 19, 19.5, to about 20 nm.

The diameter of a CeONP can range from about 2 nm to about 50 nm. In some aspects the diameter of a CeONPs can be about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the diameter of a CeONP can range from about 2 nm to about 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the diameter of a CeONP can be about 10, 10.5, 11, 11.5, 12, 12.5, 13, 13.5, 14, 14.5, 15, 15.5, 16, 16.5, 17, 17.5, 18, 18.5, 19, 19.5, to about 20 nm.

In some aspects, the average diameter of the CeONPs in the CeONP composition can range from about 2 nm to about 50 nm. In some aspects the diameter of a CeONPs can be about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the average diameter of the CeONPs in the CeONP composition can range from about 2 nm to about 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or about 50 nm. In some aspects, the average diameter of the CeONPs in the CeONP composition can be about 10, 10.5, 11, 11.5, 12, 12.5, 13, 13.5, 14, 14.5, 15, 15.5, 16, 16.5, 17, 17.5, 18, 18.5, 19, 19.5, to about 20 nm.

Different techniques can be used to measure the size of the NPs. These include SEM, TEM, XRD, AFM, and dynamic light scattering (DLS). Other methods can include using a zeta potential size analyzer/DLS to find the NPs size at extremely low level.

In some aspects, the CeONP composition can be monodisperse, with the largest dimension (e.g. diameter) of all the CeONPs in the CeONP composition being with in ±1, 2, 3, 4, or 5 percent of the mean largest diameter (e.g. diameter) of the population of CeOPs in the CeONP composition. In some aspects, the CeONP composition can be polydisperse, with the largest dimension (e.g. diameter) of each of the CeONPs in the CeONP composition not being within ±5 percent of the mean largest dimension (e.g. diameter) of the population of CeOPs in the CeONP composition. Dispersity can be measured using any suitable technique known in the art.

The CeONPs can be any shape. In some aspects, the CeONPs can be substantially spherical. In some aspects the CeONPs can be a rod, fiber, filament, tube, cube, or other regular 3D shape. In some aspects, the CeONPs can be an irregular 3D shape.

In some aspects, the concentration of CeONPs in the CeONP composition can range from about 1 pM to about 1M. In some aspects, the concentration of the CeONPs in the CeONP composition can range from about 1 pM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 pM. In some aspects, the concentration of the CeONPs in the CeONP composition can range from about 1 nM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 nM. In some aspects, the concentration of the CeONPs in the CeONP composition can range from about 1 µM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 µM. In some aspects, the concentration of the CeONPs in the CeONP composition can range from about 1 mM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 mM (or 1M).

In some aspects, the composition and/or coating included in the blood storage container and/or insert can include (when considered in total or per object surface) can include 0.01 to 100 nanoparticles per red blood cell. In some aspects, the effective number of CeONPs contained in the blood storage container (coated and/or added as a composition) and/or insert can range from about 0.01 to 100 nanoparticles per red blood cell. In some aspects, the effective number of CeONPs contained in contained in the blood storage container (coated and/or added as a composition) and/or insert can range from about 0.01, to about 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or about 1 nanoparticles per red blood cell. In some aspects, the effective number of CeONPs contained in contained in the blood storage container (coated and/or added as a composition) and/or insert can be about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or about 1 nanoparticles per red blood cell.

In some aspects, the effective number of CeONPs contained in contained in the blood storage container (coated and/or added as a composition) and/or insert can range from about 1, to about 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99 or about 100 nanoparticles per red blood cell. In some aspects, the effective number of CeONPs contained in contained in the blood storage container (coated and/or added as a composition) and/or insert can be about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99 or about 100 nanoparticles per red blood cell.

In some aspects, the CeONPs composition can include one or more other ingredients in addition to the CeONPs. In some aspects, the CeONP composition can be a solvent. As used herein, the term "solvent" can include both solvents and dispersing agents. Suitable solvents include, but are not limited to, organic solvents, inorganic solvents, aqueous solvents, non-aqueous solvents, and permissible combinations/mixtures thereof. The solvent can be organic. The solvent can be inorganic. The solvent can be aqueous. The solvent can be non-aqueous. The solvent can be biocompatible. Suitable solvents can include, but are not limited to, water, IPA, ethanol, methanol, acetone, butanone, toluene, xylene, chloroform, chlorobenzene, dichlorobenzene, trichlorobenzene, diiodooctane, octanedithiol, and/or glycerol. As previously discussed, the CeONPs can be functionalized. In some aspects the functionalization can increase the solubility of the CeONPs.

In some aspects, the CeONP composition can include a buffer. As used herein, the term "buffer" refers to a composition that is effective to change the pH of a composition to which it is added. In some aspects, the buffer is capable of modulating the pH of a composition (e.g. stored blood, blood products, or components thereof) such that the pH is kept at a physiologic pH. Suitable buffers can include, but are not limited to, Bis-Tris, ADA, ACES, PIPES, MOPSO, BES, MOPS, TESm HEPES, MOBS, TAPSO, Phosphate-based buffers, Citric Acid-based buffers, sodium phosphate-based buffers, imidazole-HCl buffers, and Tris. Other suitable buffers and their preparation will be appreciated by those of ordinary skill in the art in view of the discussion herein.

In some aspects, the CeONP composition can be a binder. Suitable binders can include, but are not limited to, polymers, cross-linking agents, resins, and the like. In some aspects, the binders can form a matrix, such as a polymer matrix. Polymer matrices are discussed and described elsewhere herein.

As described elsewhere herein, the CeONP compositions can form a coating on an object surface. The object surface can be part of a blood storage container and/or insert.

In other embodiments, the composition can be added directly to stored blood, blood product, and/or components thereof. In some aspects, the final concentration of the CeONPs in the stored blood, blood product, and/or component(s) thereof can range from about 1 μm to 1 mM. In some aspects, the concentration of the CeONPs in the CeONP composition can range from about 1 pM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 pM. In some aspects, the concentration of the CeONPs in the CeONP composition can range from about 1 nM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 nM. In some aspects, the concentration of the CeONPs in the CeONP composition can range from about 1 UM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 μM. In some aspects, the concentration of the CeONPs in the CeONP composition can range from about 1 mM to about 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 mM (or 1M).

In some aspects, the CeONP composition can be effective to increase the usable storage time of blood, blood product, and/or component thereof that is contained within a blood storage container described herein by 1, 2, 3, 4, 5, 6, 7, 8, 9, 10 or more days. In some aspects, the CeONP composition can be effective to reduce degradation of the blood, blood product, and/or component thereof by about 1% to 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, to about 500% or more. In some aspects, the CeONP composition can be effective to improve the performance of the blood, blood product, and/or component thereof as compared to the performance, blood, blood product, and/or component without exposure to the CeONP composition.

In some aspects, the CeONP composition can further include a secondary active agent in addition to the CeONPs. Secondary active agents can include polynucleotides, amino acids, peptides, polypeptides, antibodies, aptamers, ribozymes, hormones, metals, immunomodulators, anti-inflammatoires, anti-histamines, anti-infectives, chemotherapeutics, and combinations thereof.

Suitable hormones include, but are not limited to, amino-acid derived hormones (e.g. melatonin and thyroxine), small peptide hormones and protein hormones (e.g. thyrotropin-releasing hormone, vasopressin, insulin, growth hormone, luteinizing hormone, follicle-stimulating hormone, and thyroid-stimulating hormone), eicosanoids (e.g. arachidonic acid, lipoxins, and prostaglandins), and steroid hormones (e.g. estradiol, testosterone, tetrahydro testosteron Cortisol). Suitable immunomodulators include, but are not limited to, prednisone, azathioprine, 6-MP, cyclosporine, tacrolimus, methotrexate, interleukins (e.g. IL-2, IL-7, and IL-12), cytokines (e.g. interferons (e.g. IFN-α, IFN-β, IFN-ε, IFN-K, IFN-ω, and IFN-γ), granulocyte colony-stimulating factor, and imiquimod), chemokines (e.g. CCL3, CCL26 and CXCL7), cytosine phosphate-guanosine, oligodeoxynucleotides, glucans, antibodies, and aptamers).

Suitable anti-histamines include, but are not limited to, H1-receptor antagonists (e.g. acrivastine, azelastine, bilastine, brompheniramine, buclizine, bromodiphenhydramine, carbinoxamine, cetirizine, chlorpromazine, cyclizine, chlorpheniramine, clemastine, cyproheptadine, desloratadine, dexbromapheniramine, dexchlorpheniramine, dimenhydrinate, dimetindene, diphenhydramine, doxylamine, ebasine, embramine, fexofenadine, hydroxyzine, levocetirzine, loratadine, meclozine, mirtazapine, olopatadine, orphenadrine, phenindamine, pheniramine, phenyltoloxamine, promethazine, pyrilamine, quetiapine, rupatadine, tripelennamine, and triprolidine), H2-receptor antagonists (e.g. cimetidine, famotidine, lafutidine, nizatidine, rafitidine, and roxatidine), tritoqualine, catechin, cromoglicate, nedocromil, and p2-adrenergic agonists.

Suitable anti-infectives include, but are not limited to, amebicides (e.g. nitazoxanide, paromomycin, metronidazole, tinidazole, chloroquine, miltefosine, amphotericin b, and iodoquinol), aminoglycosides (e.g. paromomycin, tobramycin, gentamicin, amikacin, kanamycin, and neomycin), anthelmintics (e.g. pyrantel, mebendazole, ivermectin, praziquantel, abendazole, thiabendazole, oxamniquine), antifungals (e.g. azole antifungals (e.g. itraconazole, fluconazole, posaconazole, ketoconazole, clotrimazole, miconazole, and voriconazole), echinocandins (e.g. caspofungin, anidulafungin, and micafungin), griseofulvin, terbinafine, flucytosine, and polyenes (e.g. nystatin, and amphotericin b), antimalarial agents (e.g. pyrimethamine/sulfadoxine, artemether/lumefantrine, atovaquone/proquanil, quinine, hydroxychloroquine, mefloquine, chloroquine, doxycycline, pyrimethamine, and halofantrine), antituberculosis agents (e.g. aminosalicylates (e.g. aminosalicylic acid), isoniazid/rifampin, isoniazid/pyrazinamide/rifampin, bedaquiline, isoniazid, ethambutol, rifampin, rifabutin, rifapentine, capreomycin, and cycloserine), antivirals (e.g. amantadine, rimantadine, abacavir/lamivudine, emtricitabine/tenofovir, cobicistat/elvitegravir/emtricitabine/tenofovir, efavirenz/emtricitabine/tenofovir, avacavir/lamivudine/zidovudine, lamivudine/zidovudine, emtricitabine/tenofovir, emtricitabine/opinavir/ritonavir/tenofovir, interferon alfa-2v/ribavirin, peginterferon alfa-2b, maraviroc, raltegravir, dolutegravir, enfuvirtide, foscarnet, fomivirsen, oseltamivir, zanamivir, nevirapine, efavirenz, etravirine, rilpivirine, delaviridine, nevirapine, entecavir, lamivudine, adefovir, sofosbuvir, didanosine, tenofovir, avacivr, zidovudine, stavudine, emtricitabine, xalcitabine, telbivudine, simeprevir, boceprevir, telaprevir, lopinavir/ritonavir, fosamprenvir, dranuavir, ritonavir, tipranavir, atazanavir, nelfinavir, amprenavir, indinavir, sawuinavir, ribavirin, valcyclovir, acyclovir, famciclovir, ganciclovir, and valganciclovir), carbapenems (e.g. doripenem, meropenem, ertapenem, and cilastatin/imipenem), cephalosporins (e.g. cefadroxil, cephradine, cefazolin, cephalexin, cefepime, ceflaroline, loracarbef, cefotetan, cefuroxime, cefprozil, loracarbef, cefoxitin, cefaclor, ceftibuten, ceftriaxone, cefotaxime, cefpodoxime, cefdinir, cefixime, cefditoren, cefizoxime, and ceftazidime), glycopeptide antibiotics (e.g. vancomycin, dalbavancin, oritavancin, and telvancin), glycylcyclines (e.g. tigecycline), leprostatics (e.g. clofazimine and thalidomide), lincomycin and derivatives thereof (e.g. clindamycin and lincomycin), macrolides and derivatives thereof (e.g. telithromycin, fidaxomicin, erthromycin, azithromycin, clarithromycin, dirithromycin, and troleandomycin), linezolid, sulfamethoxazole/trimethoprim, rifaximin, chloramphenicol, fosfomycin, metronidazole, aztreonam, bacitracin, penicillins (amoxicillin, ampicillin, bacampicillin, carbenicillin, piperacillin, ticarcillin, amoxicillin/clavulanate, ampicillin/sulbactam, piperacillin/tazobactam, clavulanate/ticarcillin, penicillin, procaine penicillin, oxacillin, dicloxacillin, and nafcillin), quinolones (e.g. lomefloxacin, norfloxacin, ofloxacin, qatifloxacin, moxifloxacin, ciprofloxacin, levofloxacin, gemifloxacin, moxifloxacin, cinoxacin, nalidixic acid, enoxacin, grepafloxacin, gatifloxacin, trovafloxacin, and sparfloxacin), sulfonamides (e.g. sulfamethoxazole/trimethoprim, sulfasalazine, and sulfasoxazole), tetracyclines (e.g. doxycycline, demeclocycline, minocycline, doxycycline/salicyclic acid, doxycycline/omega-3 polyunsaturated fatty acids, and tetracycline), and urinary anti-infectives (e.g. nitrofurantoin, methenamine, fosfomycin, cinoxacin, nalidixic acid, trimethoprim, and methylene blue).

Suitable chemotherapeutics include, but are not limited to, paclitaxel, brentuximab vedotin, doxorubicin, 5-FU (fluorouracil), everolimus, pemetrexed, melphalan, pamidronate, anastrozole, exemestane, nelarabine, ofatumumab, bevacizumab, belinostat, tositumomab, carmustine, bleomycin, bosutinib, busulfan, alemtuzumab, irinotecan, vandetanib, bicalutamide, lomustine, daunorubicin, clofarabine, cabozantinib, dactinomycin, ramucirumab, cytarabine, Cytoxan, cyclophosphamide, decitabine, dexamethasone, docetaxel, hydroxyurea, decarbazine, leuprolide, epirubicin, oxaliplatin, asparaginase, estramustine, cetuximab, vismodegib, asparginase *Erwinia chrysanthemi*, amifostine, etoposide, flutamide, toremifene, fulvestrant, letrozole, degarelix, pralatrexate, methotrexate, floxuridine, obinutuzumab, gemcitabine, afatinib, imatinib mesylatem, carmustine, eribulin, trastuzumab, altretamine, topotecan, ponatinib, idarubicin, ifosfamide, ibrutinib, axitinib, interferon alfa-2a, gefitinib, romidepsin, ixabepilone, ruxolitinib, cabazitaxel, ado-trastuzumab emtansine, carfilzomib, chlorambucil, sargramostim, cladribine, mitotane, vincristine, procarbazine, megestrol, trametinib, mesna, strontium-89 chloride, mechlorethamine, mitomycin, busulfan, gemtuzumab ozogamicin, vinorelbine, filgrastim, pegfilgrastim, sorafenib, nilutamide, pentostatin, tamoxifen, mitoxantrone, pegaspargase, denileukin diftitox, alitretinoin, carboplatin, pertuzumab, cisplatin, pomalidomide, prednisone, aldesleukin, mercaptopurine, zoledronic acid, lenalidomide, rituximab, octretide, dasatinib, regorafenib, histrelin, sunitinib, siltuximab, omacetaxine, thioguanine (tioguanine), dabrafenib, erlotinib, bexarotene, temozolomide, thiotepa, thalidomide, BCG, temsirolimus, bendamustine hydrochloride, triptorelin, aresnic trioxide, lapatinib, valrubicin, panitumumab, vinblastine, bortezomib, tretinoin, azacitidine, pazopanib, teniposide, leucovorin, crizotinib, capecitabine, enzalutamide, ipilimumab, goserelin, vorinostat, idelalisib, ceritinib, abiraterone, epothilone, tafluposide, azathioprine, doxifluridine, vindesine, and all-trans retinoic acid.

Suitable metals include, but are not limited to, Ag, Au, Fe, Cu, Zn, Al, Ni, Zr, Mo, Sn, TI, B, Bi, Ba, Sb, combinations thereof, alloys thereof, and/or derivatives thereof.

In some aspects, the secondary agent can be a second nanoparticle. In some aspects, the secondary nanoparticle agent can have a core or core-shell structure. In some aspects the secondary agent nanoparticle can contain ceria. The second nanoparticle can include a polymer, metal, or both. Suitable metals can include Ag, Au, Fe, Cu, Zn, Al, Ni, Zr, Mo, Sn, TI, B, Bi, Ba, Sb, combinations thereof, alloys thereof, and/or derivatives thereof.

In some aspects, the secondary agent can be a composition that include ceria.

Blood Storage Containers and Inserts and Systems Thereof

Described herein are blood storage containers that can contain an amount of a CeONP composition described herein. It will be appreciated that any structure that is capable of holding a volume of liquid and suitable for holding blood, can be a blood storage container. Blood storage containers include smaller volume containers (e,g, vials and blood bags) and larger volume containers as well (e.g. blood flow/circulation machines (e.g. bypass machines, hemodialysis machines, and the like). In some aspects, one or more object surfaces of the blood storage container can be coated with a CeONP as described elsewhere herein. It will be appreciated that the blood storage container, in some aspects, can be composed of many components of a larger system, The object surface can be a surface within the blood storage container that will come in contact with blood, blood product, and/or component thereof when present in the blood storage container. In some aspects the blood storage container can include an insert that can be coated with CeONPs. These and further aspects of the blood storage containers are discussed below and elsewhere herein.

In some aspects, the CeONP composition is provided as liquid solution or reconstitutable solid that will mix with a volume of blood, blood product, or component thereof when the blood, blood product, or component thereof is added to the blood storage container. Also described herein are blood storage containers and blood storage container inserts that can have one or more object surfaces that can have at least one region on one or more of the object surfaces coated with one or more layers of CeONPs or a composition thereof. The coating can be substantially smooth. The coating can be textured. The CeONP coating can be effective to increase the usable storage time of blood, blood product, and/or component thereof that is contained within a blood storage container described herein by 1, 2, 3, 4, 5, 6, 7, 8, 9, 10 or more days. In some aspects, the CeONP coating can be effective to reduce degradation of the blood, blood product, and/or component thereof by about 1% to 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, to about 500% or more. The CeONP coating can be effective to improve the performance of the blood, blood product, and/or component thereof as compared to the performance, blood, blood product, and/or component without exposure to the CeONP coating.

The coating can be composed of CeONPs. In some aspects, the coating is only CeONPs. In some embodiments, the coating can be a matrix with CeONPs embedded within and/or on the surface of the matrix. The matrix can be a polymer matrix. The matrix can be a biocompatible matrix. The matrix can degrade over time such that CeONPs can be released into stored blood over time. The matrix can be non-degradable. Representative materials for forming the biodegradable polymeric matrix include, but are not limited tom natural or synthetic polymers, such as, for example, collagen, poly(alpha esters) such as poly(lactate acid), poly (glycolic acid), polyorthoesters amd polyanhydiides and their copolymers, which can be degraded by hydrolysis.

Polyglycolic acid and polyglactin fibers may be used as supplied by the manufacturer. Other biodegradable materials include cellulose ether, cellulose, cellulosic ester, fluorinated polyethylene, phenolic, poly-4-methylpentene, polyacrylonitrile, polyamide, polyamideimide, polyacrylate, polybenzoxazole, polycarbonate, polycyanoarylether, polyester, polyestercarbonate, polyether, polyetheretherketone, polyetherimide, polyetherketone, polyethersulfone, polyethylene, polyfluoroolefin, polyimide, polyolefin, polyoxadiazole, polyphenylene oxide, polyphenylene sulfide, polypropylene, polystyrene, polysulfide, polysulfone, polytetrafluoroethylene, polythioether, polytriazole, polyurethane, polyvinyl, polyvinylidene fluoride, polyglactin, regenerated cellulose, silicone, urea-formaldehyde, or copolymers or physical blends of these materials. Other suitable biodegradable materials will be appreciated by those of ordinary skill in the art in view of this disclosure.

Non-degradable materials can include, but are not limited to, poly(ethylene) (e.g. PE, HDPE, UHMWPE), poly(propylene) (PP), poly(tetrafluoroethylene) (PTFE) (e.g. Teflon® material, extended-PTFE (e.g. Gore-Tex® material), Poly (methymethacrylate) (e.g. Palacos® material), Ethylene-covinylacetate (EVA) (e.g. Elvax® material), Poly(dimethylsiloxane) (PDMS) (e.g. Silastic® material, silicone rubber), Low MW poly(dimethylsiloxane) (Silicone oil), Poly(etherurethanes) (PU) (e.g. Tecoflex® material, Tecothane® material, BioSpan® material), Poly(ethylene terphthalate) (PET) (e.g. Dacron® material), Poly(sulphone) (PS), Poly(ethyleneoxide) (PEO, PEG), Poly(ethyleneoxide-co-propyleneoxide) (PEO-PPO), (e.g Pluronics® material), Poly(vinylalcohol), and combinations thereof. In some aspects, the non-degradable materials can be biocompatible. In some aspects, the biocompatible polymers are any of those described in Shastri, P. V. 2003. Current Pharma. Biotechnol. 4:331-337. Other suitable non-degradable materials will be appreciated by those of ordinary skill in the art in view of this disclosure.

The total thickness of the coating (the total thickness when all layers considered) can range from about 0.1 nm to about 100 μm. In some aspects, the total thickness of the coating can range from about 0.1, to about 0.2, 0.3, 0.4, 0.5, 0.6, 0.7, 0.8, 0.9, 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspect, In some aspects, the total thickness can range from about 1 μm to about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 μm. In some aspects, The total thickness of the coating can range from about 1-20 nm or more, 5-10 nm, or 5 to 7 nm. Each coating layer can have a thickness ranging from about 0.1 nm to about 100 μm. In some aspects, the thickness of the each layer can range from about 0.1, to about 0.2, 0.3, 0.4, 0.5, 0.6, 0.7, 0.8, 0.9, 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspect, In some aspects, the thickness of each layer can range from about 1 μm to about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µm. Where the coating is smooth, the total thickness of the coating when measured at any point is within 0.1-5% of the mean total thickness of the coating. In aspects where the coating is textured, the total thickness varies across its surface such that the total thickness of the coating when measured at any point varies more than 5% of the mean total thickness of the coating.

Coating refers to coating or permeating CeONP or composition thereof on an object surface such that the functional and/or structural properties of the object surface are modified. Coating can be performed in one layer, or multiple layers until the desired mechanical properties are achieved. The CeONPs and compositions thereof can be deposited on an object surface using any suitable method(s). In some aspects, the CeONPs or composition thereof can be absorbed or adsorbed on the object surface to form a coating on all or part of the object surface. The CeONPs and compositions thereof can be deposited on an object surface using a Langmuir-Blodgett or Langmuir-Schaefer method, which can create a monolayer coating on the object surface. Multiple layers can be created by repeating the procedure as many times as the desired number of layers. In some aspects, the CeONP coating layer(s) on the object surface can be generated by depositing CeONP or a composition thereof on all or part of the object surface by a spin and/or dip coating method-based method. Such methods are generally known in the art. Other methods for deposition of the CeONP on all or part of the object surface can include, but are not limited to, solvent evaporation, spray coating, doctor blade, chemical vapor deposition, and transfer printing, which are generally known in the art. Other methods of coating can include, weaving (e.g. in the case of polymer matrices), molding, curing, cross-linking, and others which will be appreciated by those of ordinary skill in the art. In some aspects, a polymeric matrix can be formed as a solid block and shaped by laser or other standard machining techniques to its desired final form. Laser shaping refers to the process of removing materials using a laser.

The biodegradable polymers can be characterized with respect to mechanical properties, such as tensile strength using an Instron tester, for polymer molecular weight by gel permeation chromatography (GPC), glass, transition temperature by differential scanning calorimetry (DSC) and bond structure by infrared (IR) spectroscopy; with respect to toxicology by initial screening tests involving Ames assays and in vitro teratogenicity assays and implantation studies in animals for immunogenicity, inflammation, release and degradation studies. In vitro cell attachment and viability can be assessed using scanning electron microscopy, histology and quantitative assessment with radioisotopes. The biodegradable material may also be characterized with respect to the amount of time necessary for the material to degrade when exposed to blood, components thereof, and compositions thereof that can be stored in contact with the coated object surface.

By varying the construction, such as, for example, the thickness and mesh size, the biodegradable coating can substantially biodegrade between 1 and 365 days, 1-36 months or more. In some aspects, the biodegradable coating can substantially biodegrade between 1 and 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, or 365 days. If necessary, the biodegradable material may be constructed so as not to degrade substantially within about 3 years, or about 4 years or about five or more years or upon contact with blood, blood product, and/or component thereof. In some embodiments, the biodegradable coating is not degradable until contacted with an enzyme and/or other compound capable of initiating biodegradation of the coating. The enzyme or other compound and/or other compound capable of initiating biodegradation of the coating can be presented in the blood, blood product, and/or component thereof and thus biodegradation initiates when the blood, blood product, and/or component thereof comes in contact with the object layer coated with the biodegradable coating. In some aspects, the enzyme or other compound and/or other compound capable of initiating biodegradation of the coating is not present in the blood, blood product, and/or component thereof and can be added to the stored blood, blood product, and/or component thereof as desired during storage.

The blood storage container can be any container capable of holding a volume of a liquid. The blood storage container can contain blood, blood product, or component thereof. Suitable blood storage containers include, but are not limited to bags, bladders, sealable bins, flasks, tubes, vials, and the like. The containers, particularly the walls of such containers, can be made of any suitable material(s). Such materials can include, but are not limited to various plastics, metals (including pure, alloys, oxides and the like), glass, and combinations thereof. In some aspects, the suitable material can be permeable to one or more gases. Suitable plastics include, but are not limited to a polyolefin (including but not limited to cyclic polyolefins), a polyvinylalcohol, a polymethacrylate ether, a polyacrylic acid, a polyamide, a polysulfone, a polylactic acid, a polyester, a polyvinyl chloride, blends thereof, co-polymers thereof, and any other permissible combinations thereof. In some aspects, the blood storage container is a blood storage bag, blood component storage bag, or blood product storage bags. Representative and non-limiting blood storage containers are discussed in Prowse et al., 2013. "Commercially available blood storage containers" Vox *Sanguinis*. 106 (1), which is incorporated by reference as expressed in its entirety.

The blood storage container can hold any desired volume of blood, blood product, or component thereof. In some aspects, the blood storage container can hold about 0.1 nL to about 1000 microliters, about 1 mL to about 1000 mL, about 1 L to 2, 3, 4, about 5 L or more. In some aspects, the blood storage container can hold 0.1 to about 0.2, 0.3, 0.4, 0.5, 0.6, 0.7, 0.8, 0.9, 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000 nL. In some aspects, the blood storage container can hold about 1 µL, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000 µL. In some aspects, the blood storage container can hold about 1 mL, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000 mL. In some aspects, the blood storage container can hold about 1 L to about 1.25, 1.5, 1.75, 2, 2.25, 2.5, 2.75, 3, 3.25, 3.5, 3.75, 4, 4.25, 4.5, 4.75 or about 5 L. The blood storage container can be sealable. The blood storage container can have one or more inlets. In some aspects, the inlet and the outlet are the same port in the blood storage container. The blood storage container can have one or more outlets. The inlets and/or outlets can be configured to couple to a syringe, tubing, or other device configured to move blood, blood product, or component thereof. In some aspects, the blood container can be serializable. In some aspects, the blood container can be sterile.

The object surface that is coated with a CeONP can be part of an insert. The insert can increase the surface area of CeONPs for the blood, blood product, and/or component thereof to come in contact with. The insert can be any suitable size or shape. In some aspects, the insert can be substantially rectangular, round, elliptical, triangular, hexagonal, or any other 2D regular or irregular shape. In some aspects, the insert can be substantially the same shape as a cross section of a blood storage container. The cross section used to reference the shape of the insert can be any internal cross section of the blood storage container taken along any axis of the blood storage container. In aspects, the size of an insert with the same shape a cross-section of the blood storage container can be smaller than then actual size of the cross-section of the blood storage container such that the insert can be placed along the same axis to as reference cross section inside of the container. In some aspects the insert can touch one or more internal walls/object surfaces of the blood storage container. In some aspects, particularly when filled with blood, blood product, or component thereof the insert does not touch an internal wall or object surface of the blood storage container.

The insert can be made of any suitable material. Suitable materials include various plastics and other polymeric materials (e.g. non-plastic polymeric materials (e.g. nitrocellulose), glass. metals (including pure metals, alloys, oxides and the like), glass, and combinations thereof. In some aspects, the suitable material can be permeable to one or more gases. Suitable plastics include, but are not limited to a polyolefin (including but not limited to cyclic polyolefins), a polyvinylalcohol, a polymethacrylate ether, a polyacrylic acid, a polyamide, a polysulfone, a polylactic acid, a polyester, a polyvinyl chloride, blends thereof, co-polymers thereof, and any other permissible combinations thereof. some aspects, the insert is made of the same material as the blood storage container. In some aspects, the insert is made of a different material as the blood storage container. The insert can be flexible. The insert can be rigid. The insert can be substantially planar. The insert can form a 3D structure.

The insert can contain one or more openings that can extend partially or wholly through the insert from one side to the other. The openings can allow movement of blood, blood product, and/or component thereof with in the container. The openings can be interconnected through an insert to form a matrix of pores that, while may not individually pass completely from one side of the insert to the other side of the insert, are connected to each other such that a network of openings can allow for passage of the blood, blood product, and/or component thereof through the insert. The openings can be any desired shape or size. In some embodiments, the cross-sectional shape of each opening can be any 2D regular shape, including, but not limited to, a circle, ellipse, square, rectangle, triangle and the like. In some aspects, all the openings have the same shape and/or size. In some aspects, at least two openings have a different shape and/or size. In some aspects, the largest dimension (e.g. a diameter if a sphere or elipse) of an opening can range from about 1 nm to about 1000 mm or more. In some aspects, the largest dimension of an opening can range from about 1 nm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspects, the largest dimension of an opening can range from about 1 µm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 µm. In some aspects, the largest dimension of an opening can range from about 1 mm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mm. In some aspects, all the openings can have the same shape. In some aspects, all the openings can have different shapes, In some aspects, at least two of the openings can have different shapes. In some aspects, at least two of the openings can have the same shape. In some aspects, all the openings can be the same size. In some aspects, at least two of the openings are a different size. In some aspects, at least two of the openings are the same size.

The insert can have a length (I) as measured along the longest axis of the insert, a width (w), a height (h), and optionally a diameter (d). In some aspects, the insert length can range from about 1 micrometer to about 1000 mm. In some aspects, the insert length can range from about 1 nm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspects, the insert length can range from about 1 µm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 µm. In some aspects, the insert length can range from about 1 mm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mm.

In some aspects, the insert height can range from about 1 nm to 100 mm or more. In some aspects, the insert height can range from about 1 nm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspects, the insert height can range from about 1 µm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 µm. In some aspects, the insert height can range from about 1 mm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mm.

In some aspects, the insert width can range from about 1 nm to 1 micrometer, 10 micrometers, 100 micrometers or more. In some aspects, the insert width can range from about 1 nm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 nm. In some aspects, the insert width can range from about 1 µm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 µm. In some aspects, the insert width can range from about 1 mm to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mm.

The blood storage container can include any desired number of inserts. In some aspects, the blood storage container can have 1, 2, 3, 4, 5, 6, 7, 8, 9, 10, or more inserts. In some aspects where the blood storage container contains one or more inserts, the blood storage container, the insert(s), or both, have one or more object surfaces partially or wholly coated with a CeONP composition as described herein.

In some aspects, the total coated surface area can range from 1 $nm^2$ to 1000 $mm^2$ or more. In some aspects, the total coated surface area from about 1 $nm^2$ to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 $nm^2$. In some aspects, the total coated surface area can range from about 1 $µm^2$ to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 $µm^2$. In some aspects, the total coated surface area can range from about 1 $mm^2$ to about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mm$^2$.

In some aspects, the ratio of the amount of the total coated object surface area to volume of blood, blood product, or component thereof can range from about 0.1 to 100. The total coated object surface area is the total amount of object surface area that is coated with a CeONP composition described herein. In some aspects, the total coated object surface area to volume of blood, blood product, or component thereof can range from about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, to 100.

The blood storage containers described herein can be part of a blood, blood product, and components thereof collection, flow, and/or storage system. Many such systems are generally known in the art.

Additionally, the object surface that is coated can be the surface of an implantable device. Implantable devices include any object capable of being inserted into the body of a subject. Such devices include, but are not limited to, stents, prosthetics, grafts, needles, catheters, straws and the like. Methods of implanting such devices are generally known in the art. In aspects, the implantable device is an implantable devices that will come into contact with blood, blood product, or component thereof when implanted in the body of a subject. The implantable device can be biocompatible. The implantable device can be made of any suitable material, including, but not limited to, polymer(s), metal(s), ceramic(s), glass, paper, and combinations thereof.

In some aspects, the object surface that is coated can be a surface of a straw. The straw can be made of any suitable material including, but not limited to, polymer(s), metal(s), ceramic(s), glass, paper, and combinations thereof.

The blood storage container can be included in a system, such as a blood collection, blood filtration, and blood delivery systems. Such blood collection systems, blood filtration, and blood delivery systems are known in the art and can include bypass and hemodialysis machines. Such systems can include additional features beyond the blood storage containers as will be appreciated by those of ordinary skill in the art.

Methods of Using the Blood Storage Containers and Systems

Also described herein, are methods of using the blood storage containers and systems thereof. In some aspects, blood can be collected from a subject. The collected blood can be deposited into the blood storage containers described herein. In some aspects, the blood can be deposited through one or more inlets in the blood storage container. In aspects where there is a liquid or solid CeONP composition present in the blood storage container, when blood, blood product, and/or component thereof can come in contact with the CeONP composition present in the blood storage container and mixes with it. In aspects where the blood storage container contains a CeONP or composition thereof coated object surface, the blood, blood product, and/or component thereof can come in contact with the coated object surface(s). In some aspects where the coating is biodegradable, the coating can begin degrading when the blood, blood product, and/or component thereof comes in contact with the coating.

After depositing the blood, blood product, and/or component thereof into the blood storage container the container can be sealed, diluted, labeled, packed, or processed in other ways as would be standard in the field. In some aspects, the filled blood storage container(s) can be stored at any temperature ranging from about −80 degrees C. to about 45 degrees C. In some aspects, the filled blood storage container(s) can be stored prior to use for 1 to 24 hours. In some aspects, the filled blood storage container(s) can be stored prior to use for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 days or more. After storage, the blood can be used. In some aspects, the blood can be administered to a subject in need thereof. In some aspects, the blood can be used as a sample in an assay for diagnostic and/or research purposes. In some aspects, the CeONP compositions and devices containing the CeONP compositions and coatings thereof can increase the life span of blood, blood product, and/or component thereof by 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, to about 1000 percent or more. In some aspects, the life span of red blood cells in the blood can be increased from up to about 42 days to 100 days or more. In some aspects, the life span of platelets can be increased from about 3-7 days to 4-30 days.

In some aspects, the life span of whole blood or red blood cells stored under refrigeration (e.g. about 4 degrees C.) can be increased from 36, 37, 38, 39, 40, 41, or 42 days to more than 42 days (e.g. 43, to/or 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 days.

In some aspects, the life span of whole blood or red blood cells stored at about room temperature (e.g. about 25 degrees C.) can be increased to about 2-4 weeks (e.g. about 14-28 days). Current storage devices, compositions, and techniques do not allow for any extended storage of whole blood or red blood cells at room temperature. In some aspects, the life span of whole blood stored at high/hot temperatures (e.g. about 30 to about 45 degrees C.) can be increased to about 1 to 28 days. Current storage devices, compositions, and techniques do not allow for any storage of whole blood under hot temperatures. Current storage protocol for platelets includes storing them at room temperature with agitation. The life span of platelets using current compositions, devices, and techniques is about 3-7 days. In some aspects, using the compositions, devices, and/or techniques described herein, the life span of platelets stored at room temperature can be increased from 3 to 7 days to about 4-75 days. In some aspects, the lifespan of platelets stored under hot conditions can be increased to about 1 to 75 days. It will be appreciated that storage of platelets in hot conditions is mnot possible using current compositions, devices, and techniques.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in° C., and pressure is at or near atmospheric. Standard temperature and pressure are defined as 20° C. and 1 atmosphere.

Example 1

Storage of whole blood and blood products are temporally limited, with the storage of whole blood restricted to 42 days with refrigeration.[1-5] Degradative changes and decline in function may occur much earlier, decreasing red blood cell (RBC) survival and effective use in transfusion.[2,3] Without refrigeration, stored blood becomes unusable even sooner. Military use of blood is high, particularly in war zones. However, the storage constraints of blood in these areas often produces high demand for a limited supply, and refrigeration in the field is not always optimum.

During storage, RBCs undergo a decline in adenosine triphosphate (ATP) content, decreased mitochondrial function, alterations in pH, and increased oxidative stress due to free radical damage.[1-4] This results in oxidative damage to membrane lipids and proteins, causing stiffening and deformation of the red cell membrane. These changes make it difficult for the RBC to undergo fluid motion through capillaries. Continued radical damage from malfunctioning mitochondria, aged proteins, and a declining extracellular environment eventually results in loss of functionality and lysis of the RBCs. Lysis releases hemoglobin and its associated iron, further perpetuating a free radical cascade. An additive or coating that would eliminate oxidative stress, preserve mitochondria, buffer extracellular radicals, and serve as an oxygen sink would therefore be a likely candidate to increase storage time and functional health of stored blood.

In this Example CeONPs were added to stored blood and the effect on functional aspects of stored RBCs and effect on usable storage time can be demonstrated.

Methods.

Cerium oxide nanoparticles with an average particle size of 10 nm were purchased from Nanophase (Romeoville, IL) as a pharmaceutical grade 1.2% aqueous suspension. Particles were diluted in saline-citrate buffer for addition to whole blood to achieve the desired concentration by addition of 2 ml to 50 ml of blood. The concentrations of CeONPs chosen were 10 and 100 nM, based on their efficacy in previously performed experiments in different types of tissue cultured cells.[8,9] Whole rat blood was collected, pooled, and aliquoted into sterile 50 ml plastic containers by Biochemed (Winchester, VA). The only additive to the blood at the time of collection was sodium citrate. No other preservatives or energy sources were added. Platelets and lymphocytes were not removed from the whole blood. Upon collection, blood was shipped on ice, overnight to our lab, and CeONPs were added 24 hrs after blood collection. Controls received the addition of an equal volume of saline-citrate. Blood was stored at 40C with constant temperature monitoring. Aliquots of blood were sterilely removed from the containers each week for analysis.

Blood smears from each group were prepared and analyzed by light microscopy. Additionally, RBC counts were performed with a hemocytometer. The hemoglobin content of plasma was measured spectrophotometrically to determine RBC lysis during storage as previously described, using an assay kit from Thermo-Fisher (Charlotte, NC). 13 ATP content of stored blood was measured via a colorimetric assay kit from Thermo Fisher (Charlotte, NC). 1, 2 Total hemoglobin in the whole blood aliquot used for ATP measurement was also determined spectrophotometrically as described above. Results are expressed as umols of ATP per g of hemoglobin in the whole blood.

Blood smears were additionally analyzed by a Cytoviva (Auburn, AL) hyperspectral microscope and spectral differences between samples were determined by analysis of emission spectra.[14,15] The CytoViva hyperspectral microscope is specifically designed for optical imaging of microscopic sample elements and the creation of a spectral image from the samples, where each pixel of the image contains the full visible near infrared (Vis-Nir) emission spectrum from 400 nm-1000 nm at high spectral resolution (1.5 nm). Hence each sample has a spectral "footprint", based on its biochemical composition and morphology.[14,15] Hyperspectral imaging has been utilized to determine RBC changes with different environmental exposures and disease states. 14-17 The CytoViva system utilizes Olympus microscope components (Tokyo, Japan) coupled to CytoViva's patented enhanced darkfield illumination condenser optics (U.S. Pat. Nos. 7,564,623, 7,542,203). An aluminum halogen light source (Dolan Jenner, Boxborough, MA) is used with the optics, which produces a spectrally smooth illumination for hyperspectral imaging. These enhanced darkfield optics are designed to create high signal-to-noise darkfield optical images of samples such as blood cells and nanoparticles. In these images, the cells appear bright (high signal) against a dark (low noise) background. The microscope images shown here were captured with a 60x oil objective. The microscope was equipped with a 10 nm step translational stage (Prior Scientific, Cambridge, UK) which serves as a "push broom" mechanism for the line scan hyperspectral image capture. A transmission diffraction grating hyperspectral imager, which acts as a prism, (Specim Spectral Imaging, Oulu, Finland) was used for spectral delineation of elements of the sample. An integrated Charge-Coupled Device (CCD) is used to capture the spectral data from the spectrograph. Data was analyzed using CytoViva ENVI 4.8 hyperspectral image capture and analysis software, which integrates all microscopy and hyperspectral image capture components.

Hyperspectral imaging thus measures the emission spectrum of a sample, which is in turn driven by the unique biochemical and structural components of the sample.[14,15] Unlike chemical or molecular based spectral imaging methods (FTIR, Raman, etc) the optical spectral response for a hyperspectral image is a function of the unique emission characteristics of the sample, and are the same for all samples of the same type, but may change with dysfunction, disease, or pharmacological treatement.[14-17] Changes in the spectral response are driven by either biochemical changes, alterations in the sample morphological structure, or a combination of the two. Alterations in cellular protein structure, such as changes in the cellular hemoglobin level (which produces a distinct emission spectra) is an example of such a biochemical change.[15,16]

All experiments were repeated on 3 separate batches of blood, collected at different times, and performed in triplicate. Statistical comparisons were made between treatment groups using a two-way ANOVA with Tukey's post-hoc tests. P values of <0.01 were considered significant.

Results.

CeONPs Preserve RBC Morphology and Number During Storage.

Figure 2:
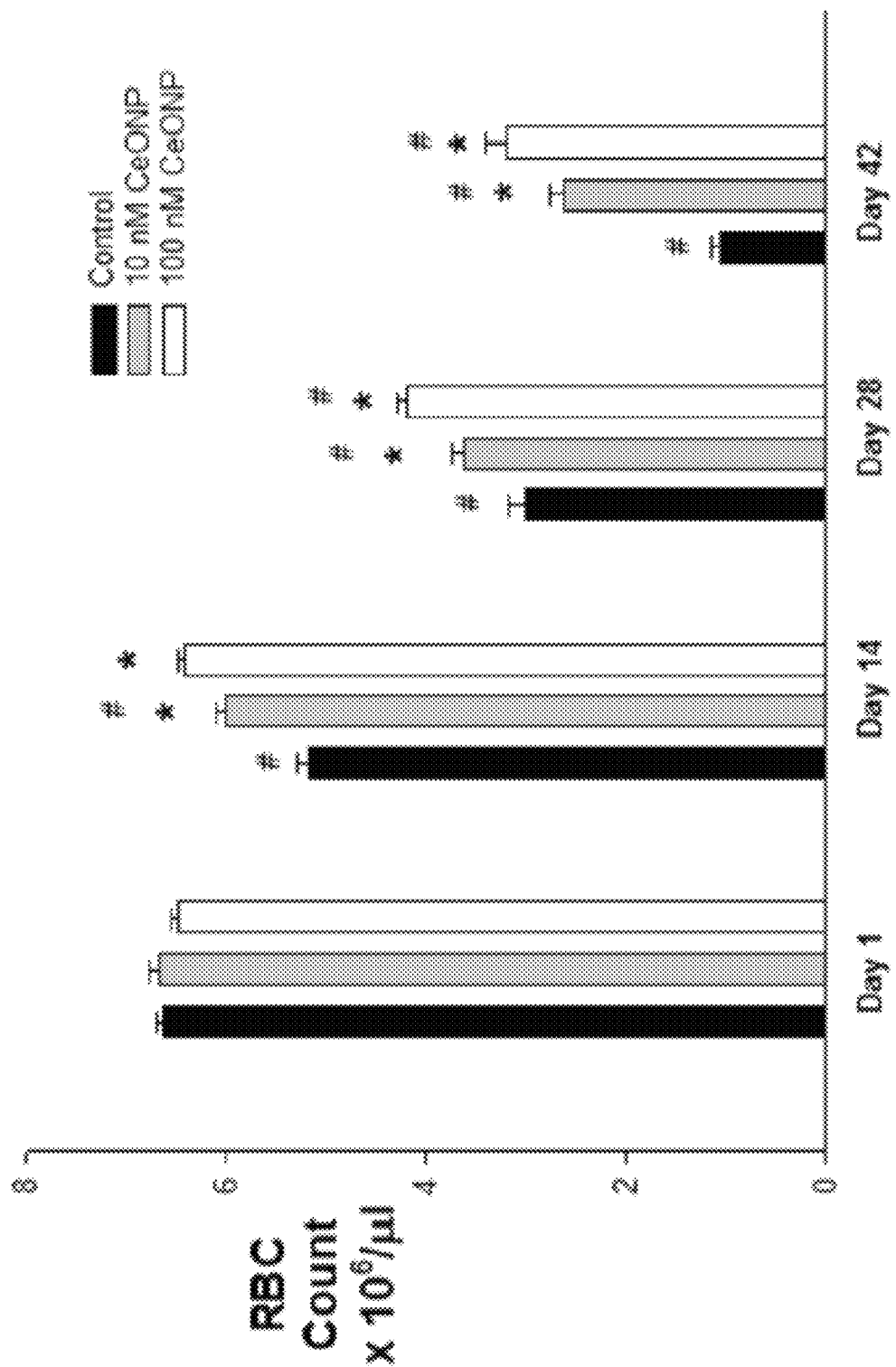
FIG. 2 shows a graph that can demonstrate that CeONPs Preserve Red Blood Cell Number During Storage. Red blood cell count during various time intervals of whole blood storage. * Significant from untreated control, $p<0.01$; Significant from day 1, $p<0.01$.

Light micrographs of stored rat blood treated with 10 or 100 nM CeONPs vs. untreated blood are shown in FIG. 1. The images presented are representative of 3 separate experiments. In controls, there is a steady decline in RBC density on days 14, 28 and 42, with a corresponding increase in red cell ghosts, visible debris and a decrease in RBC size. By day 42, very few RBCs remained in the stored blood. However, in 10 and 100 nM CeONP-treated blood, more intact red blood cells are visible with less debris, with the 100 nM dose appearing to be more effective. Absolute RBC number was also counted, as shown in FIG. 2. As expected, whole blood steadily declined in RBC number across the 42 days of storage. The decline in RBC number was noted as early as day 14, with a 19% decrease in number in untreated blood. However, in samples treated with CeONPs (10 and 100 nM), the decline in cell number was significantly less. By day 42, untreated samples had declined in RBC number by 82%, whereas CeONP-treated samples showed a decline of 65 and 53% at the 10 and 100 nM doses respectively. These results indicate that CeONPs preserve RBC number over the course of whole blood storage, as compared to untreated blood.

CeONPs Preserve Emission Spectra of RBCs During Storage.

Figure 3:
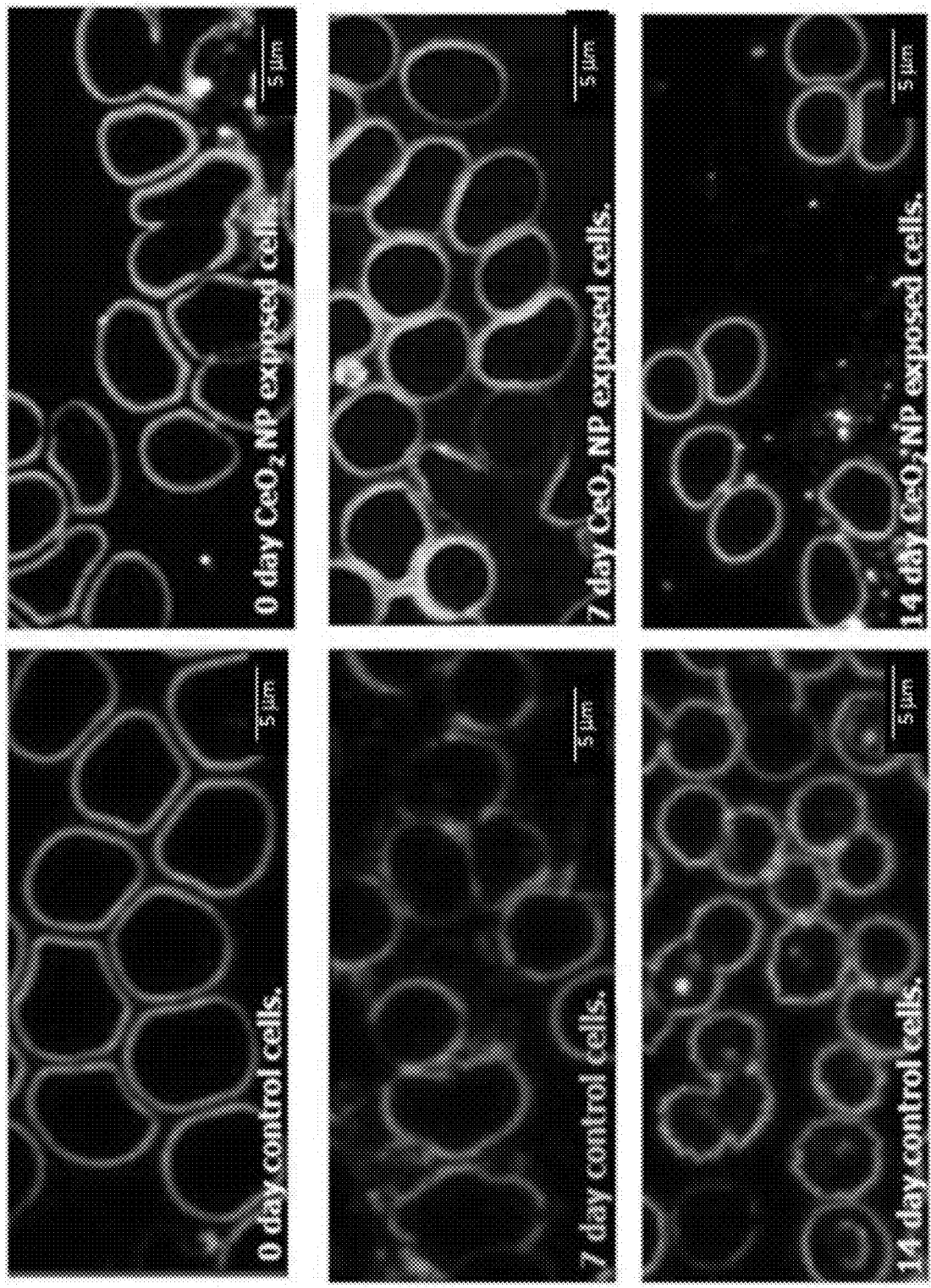
FIG. 3 shows a panel of hyperspectral Images of Stored Red Blood Cells Treated with CeONPs. Blood smears were taken at the indicated time points, and analyzed using hyperspectral imaging. The images shown are derived from emission spectra of RBCs stored with and without CeONPs as indicated. With time of storage, control red blood cells show degradative changes and crenylation of the membrane. These changes are absent from whole blood treated with 100 nM CeONPs. Total magnification 60×. Scale bar=5 μm

RBCs in stored blood were also analyzed via hyperspectral imaging, as shown in FIG. 3. During aging and other insults, alterations in the emission spectra of RBCs have been identified using hyperspectral imaging.[13,14] Note that the images shown are derived from emission spectra of RBCs, and are not micrographic images. With increasing storage time, control RBCs show degradative changes in morphology including crenylation and decreased size through 14 days of storage. In contrast, RBCs of blood treated with 100 nM CeONPs showed lack of crenylation and morphological degradative changes. The blueish white dots in the CeONP-treated images represent emission from CeONPs, which appear to be in the extracellular environment, rather than inside the cells.

Figure 4A:
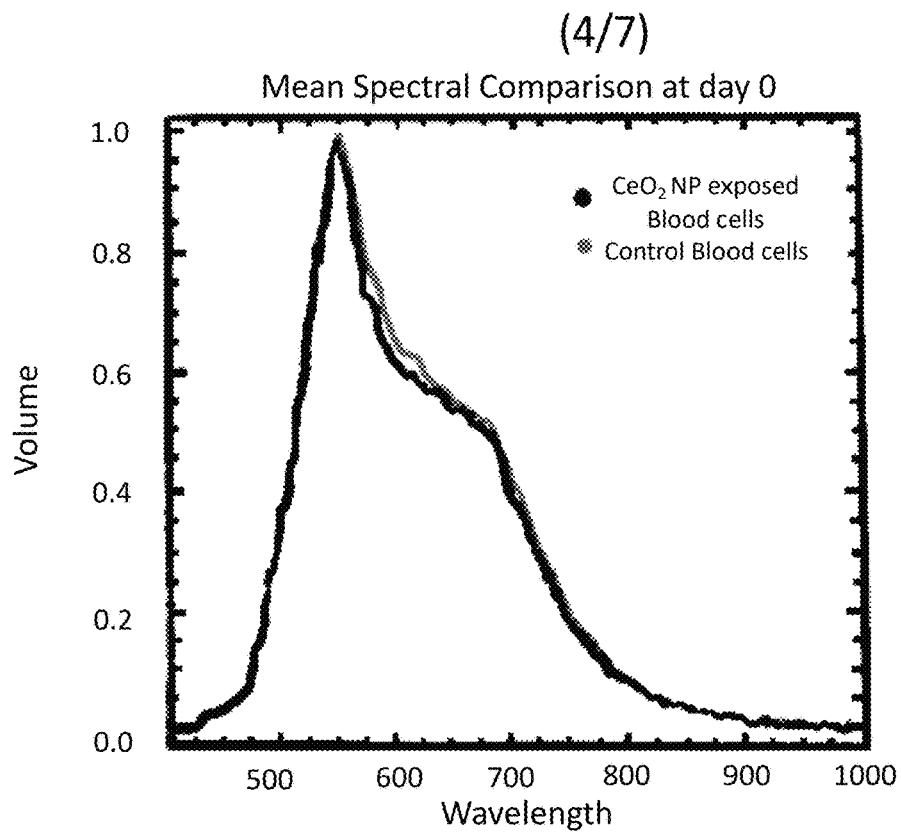
FIGS. 4A-4C show various emission spectra that can demonstrate spectral differences in stored blood treated with CeONPs. Emission spectra data from images shown in FIG. 3 are displayed in this figure. At time 0, both control and CeONP-treated blood show similar spectra. As control blood ages during storage, there is an increased emission in the 575-700 nm range, indicative of early degradative changes and membrane deformation. These changes are absent in blood stored with 100 nM CeONPs.
Figure 4B:
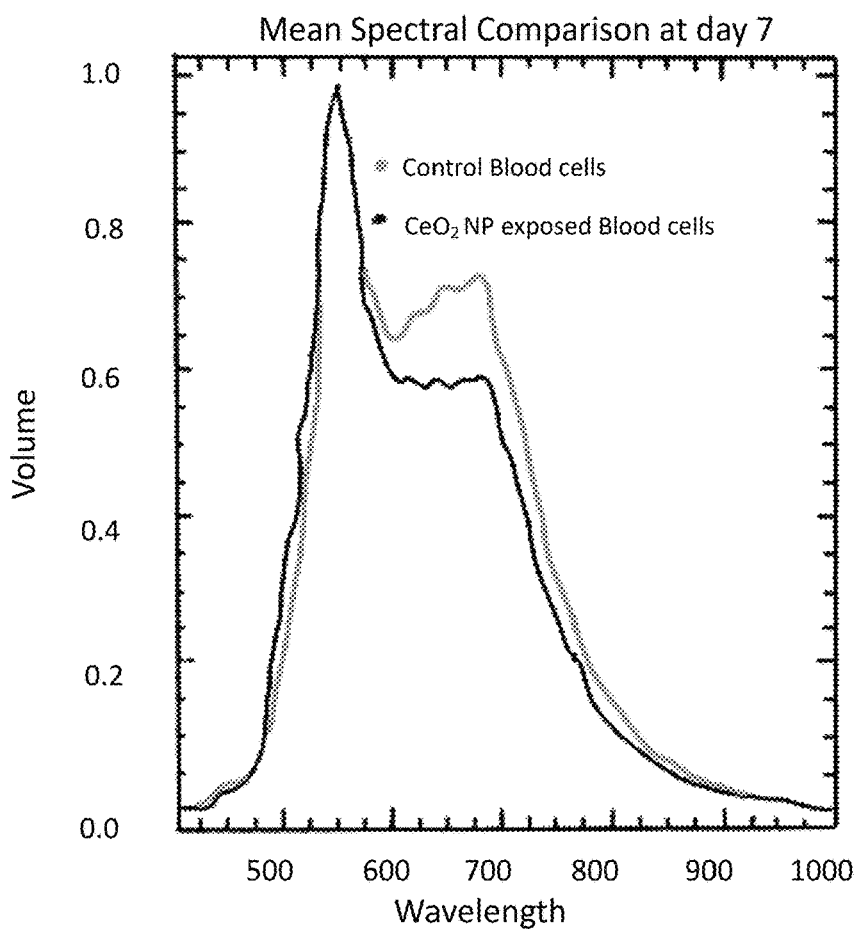
Figure 4C:
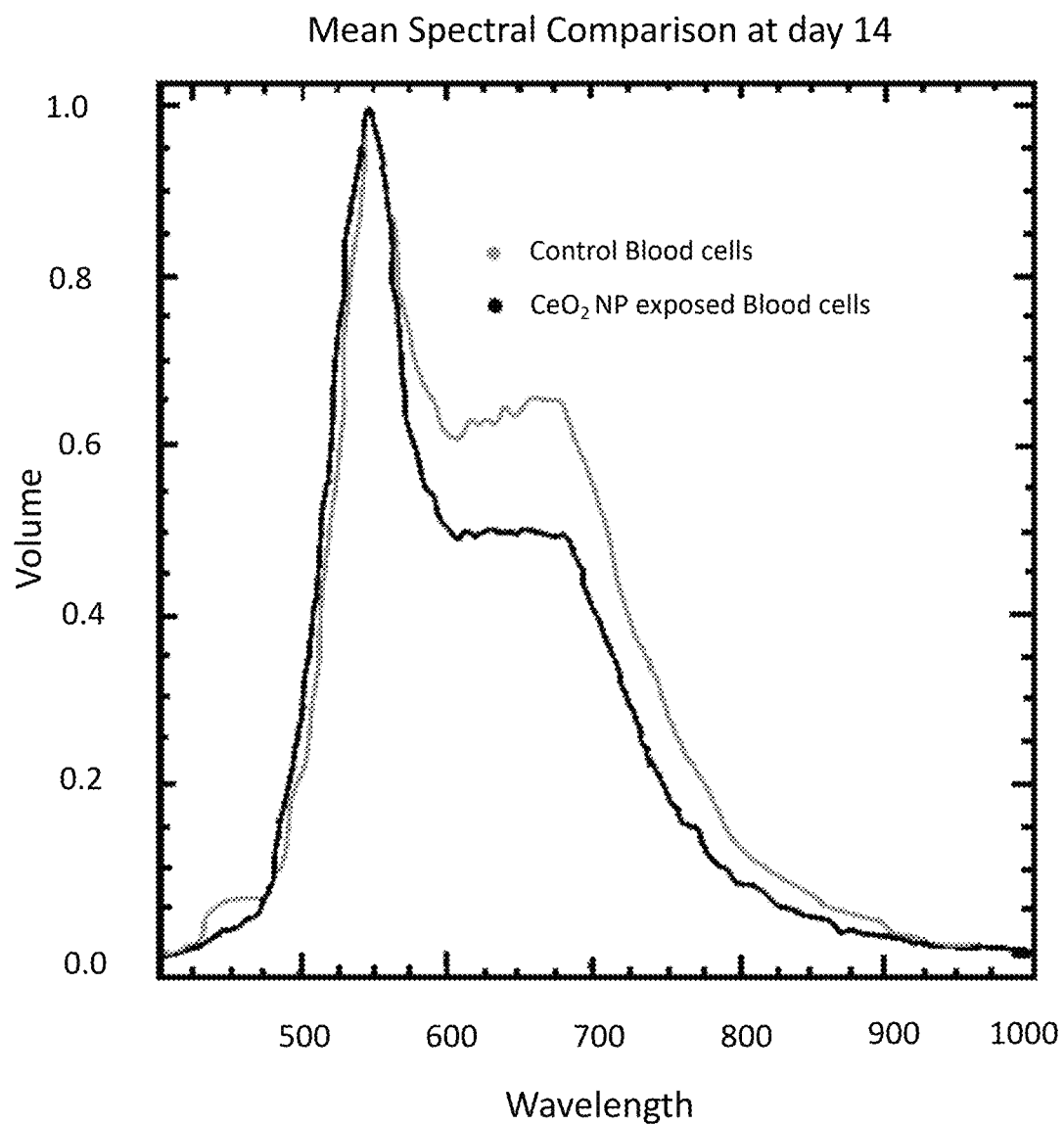

The emission spectra from the images shown in FIG. 3 are presented in FIGS. 4A-4C. The emission spectra of CeONPs have been subtracted from the spectra shown, so that only RBC emission is measured. At time zero (panel A) both control and 100 nM CeONP-treated blood show similar spectra (spectral lines are the same). These emission spectra are generated by the morphology and biochemical composition of the RBCs. As control blood ages during storage, there is increased emission in the 575-600 nm range, suggesting degradative changes in the protein or lipid millieau, as observed by others.[14-17] These changes may be related to the crenylation and deformations observed in non-CeONP treated blood, and those observed in FIG. 1. Similar changes were noted by Verebes et. al when observing degradative changes in the red blood cell.[15] These spectral changes were absent in blood stored for 14 days with 100 nM CeONPs, suggesting that CeONPs preserve some of the normal biochemical and morphology facets of RBCs during storage.

CeONPs Blunt the Increase in Plasma Hemoglobin Observed During Storage.

Figure 5:
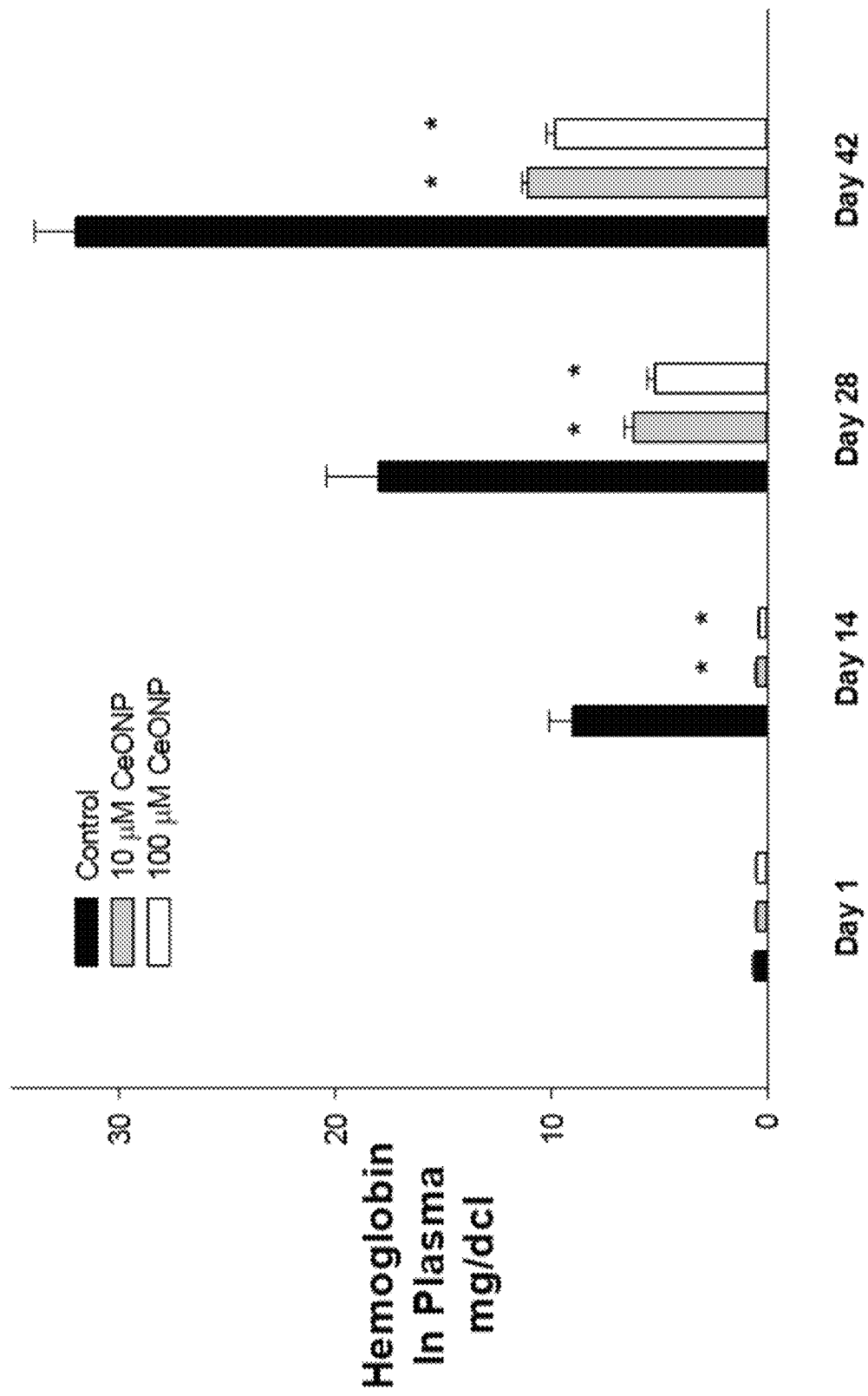
FIG. 5 shows a graph that can demonstrate that CeONPs can decrease elevations in Plasma Hemoglobin During Storage. At the indicated time points, aliquots of blood were removed from the storage container. Plasma was prepared, and hemoglobin in plasma was measured spectrophotometrically. As shown, plasma hemoglobin increases during storage, suggesting lysis of RBCs with time of storage. The amount of plasma hemoglobin generated during storage was decreased by CeONPs. * Significant from control, $p<0.01$.

FIG. 5 shows the presence of free hemoglobin in plasma during blood storage, which is released by red blood cell lysis. For these experiments, aliquots of blood were removed, plasma was prepared, and the hemoglobin content of the plasma was measured spectrophotometrically. As shown, all samples showed low free hemoglobin on day 1 of storage. Untreated blood showed a consistent increase in plasma hemoglobin during the 42 days of storage, with maximal effects being observed at 42 days of storage. After 14 days of storage, CeONP-treated blood had levels of free hemoglobin consistent with day 1 samples. After 28 days in storage, CeONP-treated samples showed an elevation in free hemoglobin in the plasma, but significantly less compared to untreated blood. Similar results were observed after 42 days of storage. Consistent with the increased RBC number during storage of CeONP-treated blood, free hemoglobin in plasma was decreased by CeONP treatment, as compared to controls, suggesting decreased lysis of RBCs during storage.

CeONPs Preserve ATP Content of Stored Blood.

Figure 6:
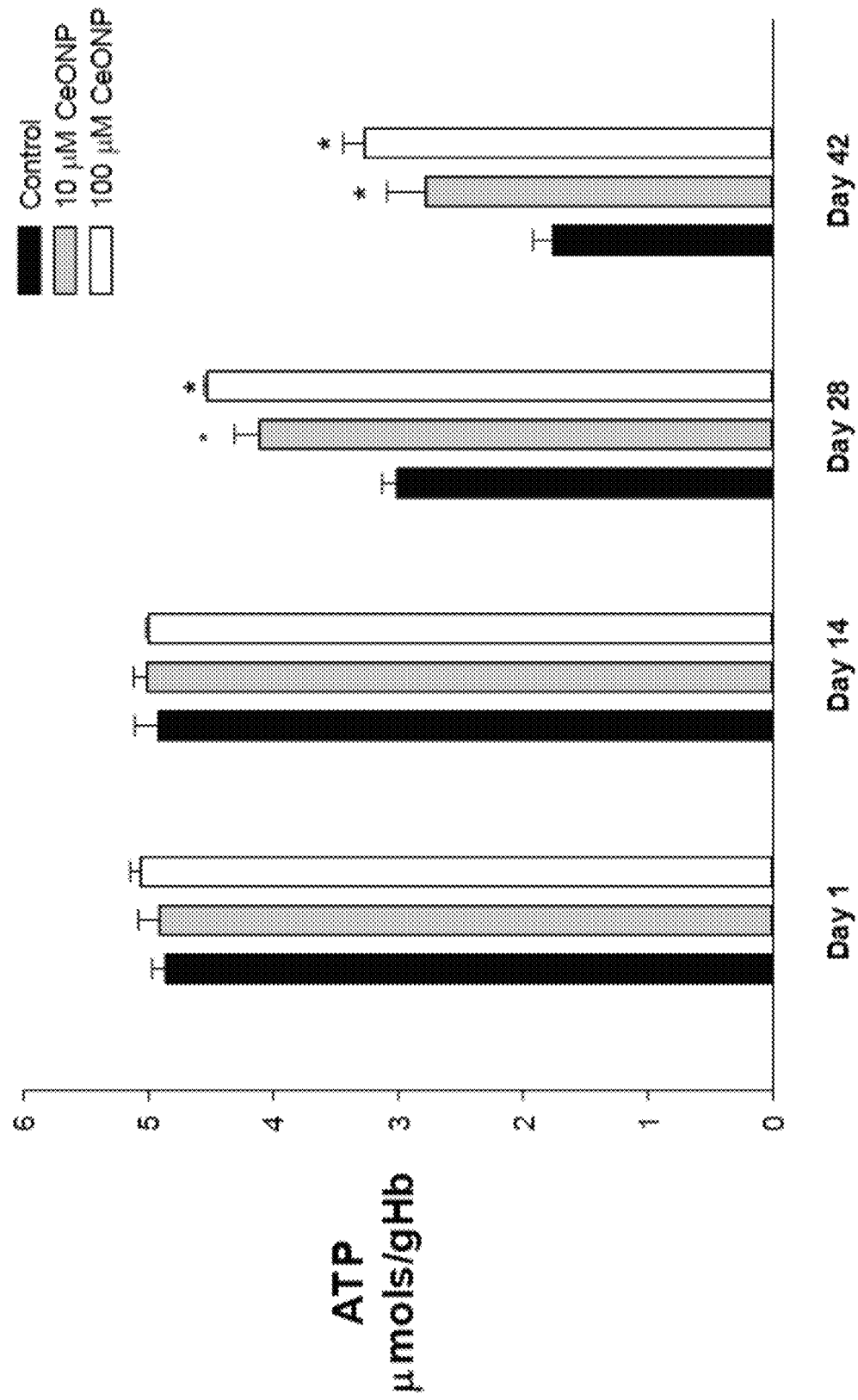
FIG. 6 shows a graph that can demonstrate that CeONPs can preserve the ATP Content of stored whole blood. At the indicated time points, aliquots of blood were removed from the storage container, and ATP content was measured via luminescence assay. Total hemoglobin in the aliquot was measured spectrophotometrically. Results are expressed as μ mols of ATP per gram of hemoglobin. At day 28 in storage, untreated blood showed a 28% decline in ATP, which continued down to 56% by day 42. However, in CeONP-treated blood, a higher level of ATP was maintained during the storage period. * Significant from control, $p<0.01$.

The levels of ATP are a critical component to RBC function and survival. As mitochondrial age and function declines during storage, the ATP content of blood also declines. Such declines can affect efficacy of RBCs in blood when delivered during transfusion. The changes in ATP content of whole rat blood during storage are shown in FIG. 6. Control and CeONP-treated blood showed similar levels of ATP through day 14 of storage. After 28 days in storage, untreated blood showed a 38% decline in ATP, which continued down to a 61% reduction at day 42. However, CeONP-treated blood maintained higher levels of ATP throughout the time in storage, exhibiting a 12 and 5% decline at day 28 and a 34 and 27% decline at day 42, for the 10 and 100 nM doses respectively. These results can demonstrate that CeONPs can preserve the ATP content of stored blood.

Free radical production is one of the hallmarks resulting in the loss of functionality and degradation of whole blood during storage, including decreased red cell number, morphological alterations, decline in ATP, and degradation of the oxygen-carrying capacity of red cells. Taken together, this Example can at least demonstrate that CeONPs can detoxify free radicals produced during blood storage and extend the lifespan of RBCs, and possibly other cells, in stored blood, even absent refrigeration. Using light microscopy, it was demonstrated preservation of RBC number and morphology with CeONP treatment. The preservation of RBC number by CeONPs was further supported by cell counts, which showed significantly more RBCs after 42 days in storage with CeONPs. At the highest dose of CeONPs (100 nM) RBC number was reduced on day 42 of storage to 48% of the day 1 number, while untreated blood had only 18% of the day 1 number remaining.

Using hyperspectral imaging, we showed that RBCs begin to show morphological changes after 7 days in storage, which continued to increase during the time of storage. These changes are consistent with those reported by other groups using hyperspectral imaging to assess RBC damage.[12,13] Analysis of the emission spectra further supported perturbations in RBC structure and possible macromolecular damage, beginning after 7 days in storage.[14,15] These spectral changes were blunted in CeONP-treated blood. As a functional measure of blood health, we ATP was also measured, which again was highest during storage in CeONP-treated groups. Although, these studies utilized rat blood, rather than human blood, it can be appropriate to extrapolate these observed results to other species, including but not limited to, human and other mammals. The results demonstrated herein can at least support the efficacy of CeONPs in preserving blood, components thereof, and/or blood products. Previous work on toxicity of CeONPs using biologically relevant doses has demonstrated that CeONPs are safe with no toxicity at does up to 1000 fold the biologically relevant dose for other applications.

References for Example 1

1. Gulliksson H, van der Meer, P F. Storage of whole blood overnight in different blood bags preceding preparation of blood components: in vitro effects on red blood cells. Blood Transfusion 2009; 7:210-215.
2. Lagerberg J W, Korstein H, van der Meer P F, de Korte D. Prevention of red cell storage lesion: a comparison of five different additive solutions. Blood Transfusion 2017; 15:456-462.
3. Bardyn M, Rappaz B, Jaferzadeh K, Crettaz D, Tissot J-D, Moon I, Turcatti G, Lion N, Prudent M. Red blood cells ageing markers: a multi-parametric analysis. Blood Transfusion 2017; 15:239-248.
4. Copeland B E, Dyer P J, Pesce A J. Hemoglobin determination in plasma or serum by first-derivative recording spectrophotometry. Am J Clin Pathol 1989; 92:619-624.
5. Hess J R. Conventional blood banking and blood component storage regulation: opportunities for improvement. Blood Transfusion 2010; 8: Suppl 3, S9-S15.
6. Bailey D, Chow L, Merchant S, Kuiry S, Patil S, Seal S and Rzigalinski B A Cerium Oxide nanoparticles extend cell longevity and act as free radical scavengers. Nature Biotechnology 2003; 14:112.
7. Rzigalinski B A. Nanoparticles & cell longevity. Tech. Cancer Res. Treatment 2005; 4:651-660.
8. Rzigalinski B A, Meehan C, Davis R M, Miles W C, Cohen C A. Radical Nanomedicine, Nanomedicine 2006; 1:399-412.
9. Singh N, Cohen C A, Rzigalinski, B A. Cerium oxide nanoparticles are neuroprotective for free radical injury and enhance neuronal longevity. Proc. N.Y. Acad. Sci. 2007; 1122:219-230.
10. Rzigalinski B A, Meehan K, Whiting M D, Dillon C E, Hockey K, and Brewer M. Antioxidant Nanoparticles in Nanomedicine in Health and Disease, R J Hunter and V R Preedy, eds., CRC Press, NY, 2011.
11. Frey A, Bates J A, Sholar C, Hockey K S, Rzigalinski B A Cerium oxide nanoparticles as a disease-modifying therapy for Parkinson's disease. Neuroscience 2014; Abstract #199.01.
12. Bailey Z C, Nilson E, Bates J A, Oyalowo A, Hockey K S, Sajja V S, Thorpe C, Rogers H, Dunn B, Frey A S, Billings M J, Sholar C A, Hermundstad A, Kumar C, VandeVord P J, Rzigalinski B A. Cerium oxide nanoparticles improve outcome after in vitro and in vivo mild traumatic brain injury. J. Neurotrauma 2016; 33:1-11
13. Frey J, Guan A, Li Z, Turtil S, Phillips K S. Hemoglobin assay for validation and quality control of medical device reprocessing. Anal Bioanal Chem 2015; 407:6885-6889
14. Conti M, Scaferlato R, Louka M, Sansone A, Marzetti C, Ferreri C. Building up spectral libraries for mapping erythrocytes by hyperspectral dark field microscopy. Biomed Spectros Imaging 2016; 5:175-194.
15. Verebes G S, Melchiorre M, Garcia-Leis A, Ferreri C, Marzetti C, Torreggiani A. Hyperspectral enhanced dark field microscopy for imaging blood cells. J Biophotonics 2013; 10:1-8.
16. Moore T, Sorokulova I, Pustovyy O, Globa L, Pascoe D, Rudisill M, Vodyanoy V. Microscopic evaluation of vesicles shed by erythrocytes at elevated temperatures. Microsc Res Tech 2013, 76:1163-1160, DOI 10.1001/jemt.22280
17. Giacometti G, Ferreri C, Sansone A, Chatgilialoglu C, Marzetti C, Spyratou E, Georgakilas A G, Marini M, Abruzzo P M, Bolotta A, Ghezzo A, Minguzzi R, Posar A, Visconti P. High predictive values of RBC membrane-based diagnostics by biophotonics in an integrated approach for Autism Spectrum Disorders. Sci Rep 2017, 7:9854, DOI: 10.1038/s41598-017-10361-7.
18. Rzigalinski B A, Carfagna C S, Ehrich M. Cerium oxide nanoparticles in neuroprotection and considerations for efficacy and safety. WIREs Nanomed Nanobiotech 2016; doi 10.1002/wnan.1444.

Further attributes, features, and embodiments of the present invention can be understood by reference to the following numbered aspects of the disclosed invention. Reference to disclosure in any of the preceding aspects is applicable to any preceding numbered aspect and to any combination of any number of preceding aspects, as recognized by appropriate antecedent disclosure in any combination of preceding aspects that can be made. The following numbered aspects are provided:

1. A blood storage container comprising a blood storage container object surface, comprising:
   cerium oxide nanoparticles (CeONPs) present in an amount effective to increase the useful storage life of blood, blood product(s), components thereof, and combinations thereof when such blood, blood product(s), and components thereof are stored in contact with the blood storage container object surface.

2. The blood storage container of aspect 1, wherein the CeONPs are contained in a liquid composition present within the blood storage container and capable of mixing with blood, blood product, or components thereof stored within the blood storage container.

3. The blood storage container of any of aspects 1-2, wherein the CeONPs are contained in a solid composition present within the blood storage container and capable of being reconstituted upon mixing with blood, blood product, or components thereof stored within the blood storage container.

4. The blood storage container of any one of aspects 1-3, wherein the concentration of the CeONPs after mixing ranges from about 10 nm to about 100 nm.

5. The blood storage container as in any of aspects 1-4, wherein the largest dimension of the CeONPs range from about 2 nm to about 50 nm.

6. The blood storage container of any of aspects 1-5, further comprising a coating disposed on one or more areas of the blood container object surface area, wherein the CeONPs form or are part of a composition that forms the coating on the one or more areas of the blood storage container object surface.

7. The blood storage container of any of aspects 1-6, wherein the coating is biodegradable.

8. The blood storage container of any of aspects 1-7, further comprising an insert, wherein the insert comprises an insert object surface.

9. The blood storage container of any of aspects 1-8, wherein the insert comprises one or more openings or voids.

10. The blood storage container of any of aspects 1-9, wherein the insert object surface comprises a coating, wherein the coating is disposed on one or more areas on the insert object surface and wherein the coating on the insert object surface comprises CeONPs present in an amount effective to increase the useful storage life of blood, blood product(s), components thereof, and combinations thereof when such blood, blood product(s), and components thereof are stored in contact with the insert object surface in the blood storage container.

11. The blood storage container of any of aspects 1-10, wherein the coating on the insert object surface is biodegradable.

12. The blood storage container as in any one of aspects 1-11, further comprising blood, blood product, blood component and combinations thereof contained within the container.

13. The blood storage container as in any one of aspects 1-12, wherein the blood storage container is a blood storage bag.

14. A system comprising:
a blood storage container as in any one of aspects 1-13.

15. A method comprising: storing blood, blood product, component thereof, or a combination thereof at a temperature ranging from about −80 degrees C. to about 45 degrees C., wherein the blood, blood product, component thereof, or a combination thereof is contained in a blood storage container as in one of aspects 1-13

16. The method of aspect 15, wherein the temperature ranges from about −80 degrees C. to about 4 degrees C.

17. The method of aspect 15, wherein the temperature ranges from about 5 degrees C. to 29 degrees C.

18. The method of aspect 15, wherein the temperature ranges from 30 degrees C. to about 45 degrees C.

19. The method of any one of claims 15-18, wherein the step of storing blood, blood product, component thereof, or combination thereof occurs for 1 to 200 days.

20. A method of storing whole blood, the method comprising: storing the whole blood at a temperature ranging from about −80 degrees C. to about 45 degrees C., wherein the whole blood is contained in a blood storage container as in one of aspects 1-13.

21. The method of aspect 20, wherein the temperature ranges from about −80 degrees C. to 4 degrees C. and wherein the whole blood is stored for 1 to 200 days.

22. The method of aspect 20, wherein the temperature ranges from 5 to 29 degrees C. or from 30 to about 45 degrees C. and wherein the whole blood is stored for 1 to 28 days.

23. The method of any of aspects 20-22, further comprising the step of administering the stored whole blood after storage to a subject.

24. A method of storing red blood cells, the method comprising: storing the red blood cells at a temperature ranging from about −80 degrees C. to about 45 degrees C., wherein the red blood cells are contained in a blood storage container as in one of aspects 1-13.

25. The method of aspect 24, wherein the temperature ranges from 5 to 29 degrees C. or from 30 to about 45 degrees C. and wherein the red blood cells are stored for 1 to 28 days.

26. The method of aspect 24, wherein the temperature ranges from about −80 degrees C. to 4 degrees C. and wherein the red blood cells are stored for 1 to 200 days.

27. The method of any of aspects 24-26, further comprising the step of administering the stored red blood cells after storage to a subject.

28. A method of storing platelets, the method comprising: storing the platelets at a temperature ranging from about 5 degrees C. to about 29 degrees C. and wherein the platelets are contained in a blood storage container as in one of aspects 1-13.

29. The method of aspect 28, wherein the temperature ranges from 5 to 29 degrees C. or from 30 to about 45 degrees C. and wherein the platelets are stored for 1 to 28 days.

30. The method of any of aspects 28-29, further comprising the step of administering the stored platelets after storage to a subject.

31. A method comprising: depositing blood, blood product, component(s) thereof, and combinations thereof into a blood storage container as in any one of aspects 1-13.

32. The method of aspect 31, further comprising the step of storing the blood storage container for a period of time at a temperature.

33. The method of any of aspects 31-32, wherein the period of time ranges from 1 to 200 days.

34. The method of any of aspects 31-33, wherein the temperature ranges from about −80 to about 45 degrees C.

35. A blood container insert having an object surface, the insert comprising:
a coating, wherein the coating is disposed on one or more areas on the object surface and wherein the coating on the object surface comprises CeONPs present in an amount effective to increase the useful storage life of blood, blood product(s), components thereof, and combinations thereof when such blood, blood product(s), and components thereof are stored in contact with the insert object surface inside of the blood storage container.

36. The blood container insert of aspect 35, wherein the blood container insert comprises one or more openings or voids.

37. The blood container insert of any one of aspects 35-36, wherein the coating is biodegradable.

38. An implant having an object surface comprising: a coating, wherein the coating is disposed on one or more areas on the object surface and wherein the coating on the object surface comprises CeONPs.

39. A method comprising: implanting the implant of aspect 38 into a subject in need thereof.

We claim:

1. A blood storage container comprising:
a blood storage container object surface; and
cerium oxide nanoparticles (CeONPs) present in an amount to yield a concentration of CeNOPs of 10 nM to 100 nM in a blood, blood product(s), components thereof, or any combination thereof when stored in the blood storage container that is effective to (a) maintain an ATP concentration of at least 4.0 µmols/gHb in the blood, blood product(s), components thereof, or any combination thereof when stored in the blood storage container for 28 days at 4 degrees C. (b) maintain an ATP concentration of at least 2.8 µmols/gHb in the blood, blood product(s), components thereof, or any combination thereof when stored in the blood storage container for 42 days at 4 degrees C.; or (c) both (a) and (b) thereby increasing the useful storage life of blood, blood product(s), components thereof, or any combination thereof when stored in the blood storage container.

2. The blood storage container of claim 1, wherein the CeONPs are contained in a liquid composition present within the blood storage container and capable of mixing with blood, blood product, or components thereof stored within the blood storage container or are contained in a solid composition present within the blood storage container and capable of being reconstituted upon mixing with blood, blood product, or components thereof stored within the blood storage container.

3. The blood storage container of claim 1, wherein the blood storage container comprises a polymer matrix and wherein the CeONPs are embedded in the polymer matrix.

4. The blood storage container as in claim 1, wherein the each of the CeONP of the CeONPs consist of CeO.

5. The blood storage container as in claim 1, wherein the average diameter of the CeONPs ranges from about 2 nm to about 50 nm.

6. The blood storage container of claim 1, further comprising a coating disposed on one or more areas of the blood container object surface, wherein the CeONPs form or are part of a composition that forms the coating on the one or more areas of the blood storage container object surface.

7. The blood storage container of claim 6, wherein the coating is biocompatible, biodegradable, or both.

8. The blood storage container as in claim 6, wherein the coating comprises a polymer matrix and wherein the CeONPs are embedded in the polymer matrix.

9. The blood storage container as claim 1, wherein the blood storage container comprises a buffer composition that maintains a physiologic pH, a physiologic ionic strength, or both.

10. The blood storage container as in claim 1, further comprising a blood, blood product, blood component or any combination thereof contained within the blood storage container.

11. The blood storage container as in claim 1, wherein the blood storage container is a blood storage bag.

12. A blood storage container comprising:
a blood storage container object surface comprising a polymer matrix; and
cerium oxide nanoparticles (CeONPs) embedded in said polymer matrix and present in an amount effective to increase the useful storage life of blood, blood product(s), components thereof, and combinations thereof when such blood, blood product(s), and components thereof are stored in the blood storage container.

13. The blood storage container of claim 12, wherein the polymer matrix is biocompatible, biodegradable, or both.

14. The blood storage container of claim 12, wherein the average diameter of the CeONPs ranges from about 2 nm to about 50 nm.

15. The blood storage container of claim 12, wherein the blood storage container object surface comprises a coating and wherein the coating comprises the polymer matrix.

16. The blood storage container of claim 12, wherein the blood storage container object surface is an object surface on an insert, a wall of the blood storage container, or both.

* * * * *